(12) United States Patent
Arima et al.

(10) Patent No.: US 7,956,813 B2
(45) Date of Patent: Jun. 7, 2011

(54) ELECTRONIC DEVICE

(75) Inventors: Kiyokuni Arima, Nagano (JP); Takeshi Kaeriyama, Nagano (JP)

(73) Assignee: Sony Corporation, Tokyo (JP)

( * ) Notice: Subject to any disclaimer, the term of this patent is extended or adjusted under 35 U.S.C. 154(b) by 452 days.

(21) Appl. No.: 12/121,221

(22) Filed: May 15, 2008

(65) Prior Publication Data
US 2008/0284663 A1 Nov. 20, 2008

(30) Foreign Application Priority Data

May 16, 2007 (JP) .............................. P2007-130720

(51) Int. Cl.
*H01Q 1/24* (2006.01)
(52) U.S. Cl. ............... 343/702; 361/679.26; 361/679.27
(58) Field of Classification Search .................. 343/702; 361/679.26, 679.27
See application file for complete search history.

(56) References Cited

U.S. PATENT DOCUMENTS

| | | | |
|---|---|---|---|
| 2004/0160370 A1* | 8/2004 | Ghosh et al. | 343/702 |
| 2006/0049993 A1* | 3/2006 | Lin et al. | 343/702 |
| 2008/0111746 A1* | 5/2008 | Levy et al. | 343/702 |

FOREIGN PATENT DOCUMENTS

JP 2002-32150 1/2002

* cited by examiner

*Primary Examiner* — Douglas W Owens
*Assistant Examiner* — Dieu Hien T Duong
(74) *Attorney, Agent, or Firm* — Oblon, Spivak, McClelland, Maier & Neustadt, L.L.P.

(57) ABSTRACT

An electronic device is described which includes multiple first antennas; at least one second antenna configured to be used in a different wireless communication system therefrom; a display panel for displaying an image; a panel casing including for covering the display panel, including the display panel; a placement frame having an upper-face portion disposed on the outer perimeter of the panel casing, and extended horizontally, and a pair of side-face portions, each protruding from a different side-edge portion of the upper-face portion in the direction orthogonal thereto; and an outer frame for covering the outer perimeter and the placement frame of the display panel from the display surface side of the display panel; wherein at least one first antenna is disposed on each of the upper-face portion and one side-face portion of the placement frame; and wherein at least one second antenna is disposed on the upper-face portion or the other side-face portion of the placement frame.

8 Claims, 34 Drawing Sheets

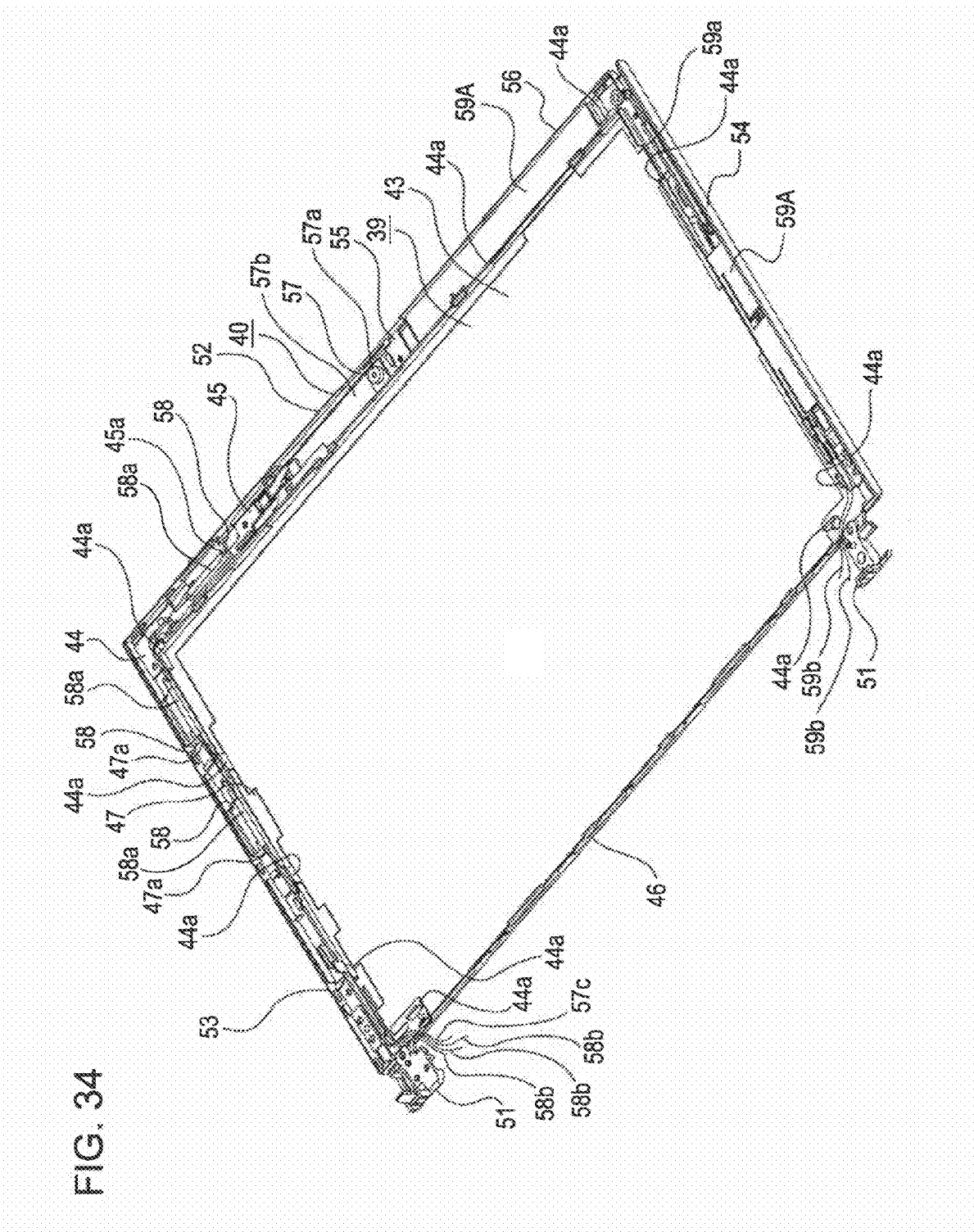

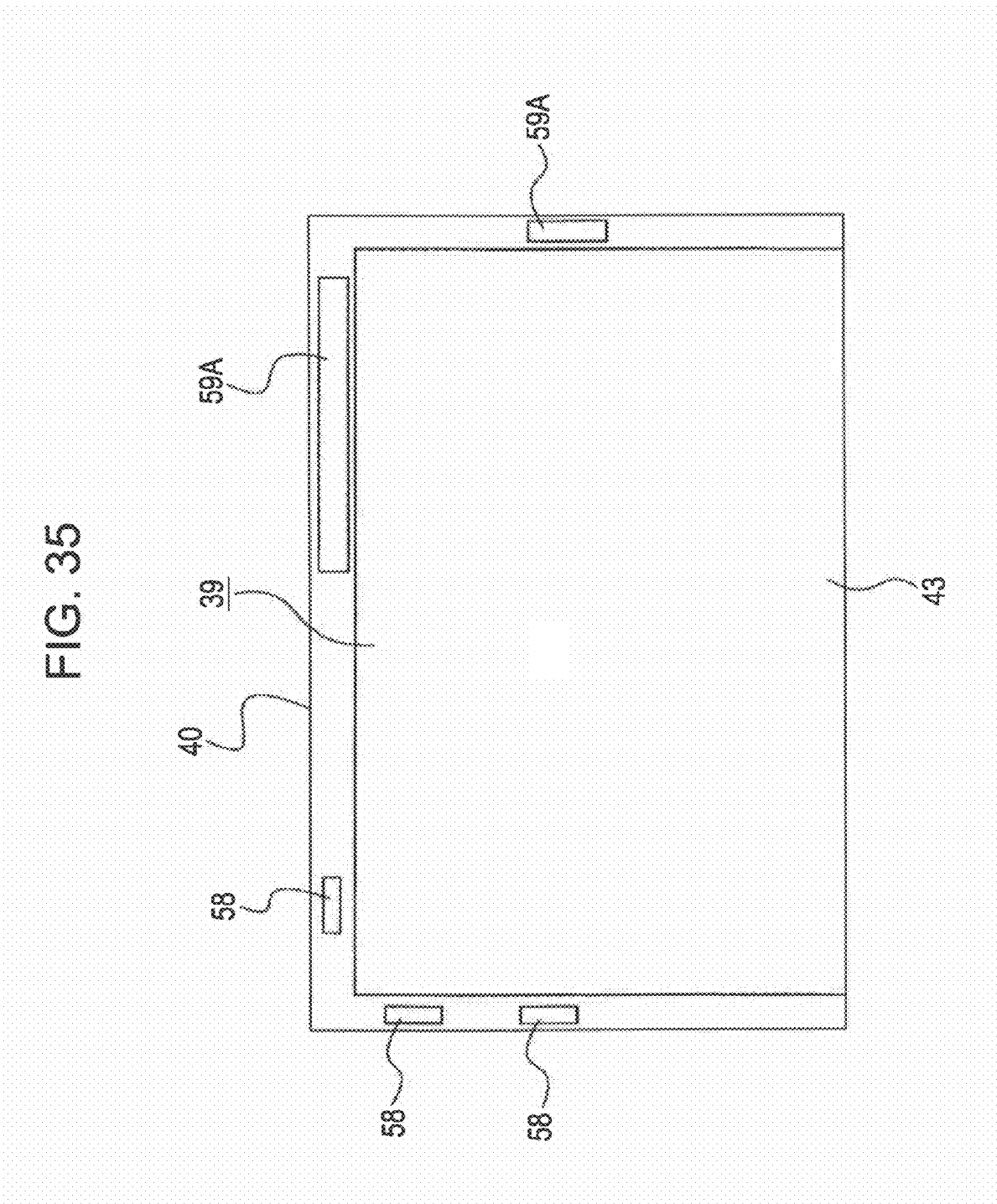

ELECTRONIC DEVICE

CROSS REFERENCES TO RELATED APPLICATIONS

The present invention contains subject matter related to Japanese Patent Application JP 2007-130720 filed in the Japanese Patent Office on May 16, 2007 the entire contents of which are incorporated herein by reference.

BACKGROUND OF THE INVENTION

1. Field of the Invention

The present invention relates to the technical field regarding electronic devices. Specifically, the present invention relates to the technical field for realizing improvement in communication performance with multiple antennas being disposed on the upper face portion and side face portion of a placement frame to ensure placement space for the antennas.

2. Description of the Related Art

Among electronic devices such as personal computers, cellular phones, PDAs (Personal Digital Assistant), and so forth, for example, there is an electronic device wherein an antenna for performing communication employing a predetermined method is disposed in the inside of a display portion including a display panel (for example, see Japanese Unexamined Patent Application Publication No. 2002-32150).

With such an electronic device, a panel casing where a display panel is disposed can be formed of a metal material to realize improvement in suppression of unnecessary radiation and intensity, but when an antenna is disposed on the panel casing, deterioration of reception sensitivity is sometimes caused by noise propagating through the inside of the metal material.

As a method for dealing with this, there has been proposed a method in the related art wherein an antenna placement member formed of a resin material is attached to one edge portion of a panel casing, and an antenna is disposed on this antenna placement member (see Japanese Unexamined Patent Application Publication No. 2002-32150).

SUMMARY OF THE INVENTION

Note however, in recent years, according to extension of communication methods, the need to dispose multiple antennas employing different communication methods has increased, and there has been a need to dispose multiple antennas of the same type depending on communication method, and accordingly, the number of the antennas to be disposed within the display portion has increased.

Accordingly, with the above-mentioned existing method wherein an antenna placement member formed of a resin material is attached to one edge portion of a panel casing, it has been difficult to ensure sufficient space for disposing antennas, and there has been a possibility of causing deterioration in communication performance.

There has been recognized a need to realize improvement in communication performance in addition to ensuring placement space for multiple antennas for an electronic device.

An electronic device according to an embodiment of the present invention is an electronic device includes: a display panel configured to display an image; a panel casing where the display panel is disposed configured to cover the display panel from the opposite side of the display surface; a placement frame formed of a nonmetallic material having an upper face portion which is disposed on the outer circumference of the panel casing, and extends in the horizontal direction, and a pair of side face portions protruding from both side edge portions of the upper face portion in the direction orthogonal thereto respectively; and an outer frame formed of a nonmetallic material configured to cover the outer circumferential portion and the placement frame of the display panel from the display surface side of the display panel; wherein at least one first antenna is disposed on each of the upper face portion and one side face portion of the placement frame; and wherein at least one second antenna is disposed on the upper face portion or the other side face portion of the placement frame.

An electronic device according to an embodiment of the present invention includes: a plurality of first antennas; at least one second antenna configured to be used in a different wireless communication system than the plurality of first antennas; a display panel configured to display an image; a panel casing configured to cover the display panel on a side opposite to a display surface; a placement frame formed of a nonmetallic material having an upper face portion which is disposed on the outer perimeter of the panel casing and extending in the horizontal direction, and a pair of side face portions, each protruding from a different side edge portion of the upper face portion in a direction orthogonal thereto; and an outer frame formed of a nonmetallic material configured to cover the outer perimeter and the placement frame of the display panel from the display surface side of the display panel; wherein at least one first antenna is disposed on each of the upper face portion and one of the pair of side face portion of the placement frame; and wherein at least one second antenna is disposed on the upper face portion or the other side face portion of the placement frame.

Accordingly, at least one antenna is disposed on each of the upper face portion and the pair of side face portions of the placement frame.

Accordingly, improvement in communication performance can be realized following sufficient space being ensured for disposing the first antennas and the second antenna, which are configured for use in different wireless communication systems.

There may be provided a plurality of engagement portions disposed on the placement frame, and a plurality of engagement portions disposed on the outer frame with which the plurality of engagement portions of the placement frame are engaged respectively; wherein the placement frame and the outer frame are configured to be connected only by engagement between the engagement portions of the placement frame and the engagement portions of the outer frame, whereby improvement in the reception sensitivity of the first antennas and second antenna can be realized without employing attaching screws made of metal which may cause deterioration in reception sensitivity at the time of connection between the placement frame and outer frame.

There may be provided a plurality of connection engagement portions disposed on the placement frame, and a plurality of connection engagement portions disposed on the panel casing with which the plurality of connection engagement portions of the placement frame are engaged respectively; wherein the placement frame and the panel casing are configured to be connected only by engagement between the connection engagement portions of the placement frame and the connection engagement portions of the panel casing, whereby improvement in the reception sensitivity of the first antennas and second antenna can be realized without employing attaching screws made of metal which may cause deterioration in reception sensitivity at the time of connection between the placement frame and panel casing.

The second antenna may be configured so as to be drawn out or stored in the space formed between the placement frame and the outer frame, whereby the second antenna can be pulled upward when the second antenna is drawn out to improve reception sensitivity.

BRIEF DESCRIPTION OF THE DRAWINGS

FIG. 34 is a perspective view illustrating a state in which the respective portions including another type of second antenna are attached to the panel casing and placement frame; and FIG. 35 is a conceptual view illustrating a state in which the first antenna and another type of second antenna are disposed on the placement frame.

DESCRIPTION OF THE PREFERRED EMBODIMENTS

Preferred embodiments for implementing the present invention will be described below with reference to the appended drawings. With the non-limiting embodiments described below, an electronic device according to the present invention is applied to a personal computer serving as an information processing device.

With the following description, in a state in which a user visually recognizes the display screen of the personal computer, the front-and-rear, vertical, and horizontal directions are shown as viewed from the user. Accordingly, the user side is assumed to be the front. Note that the front-and-rear, vertical, and horizontal directions shown below are for the sake of convenience of description, and implementation of the present invention is not restricted to those directions.

Figure 1:
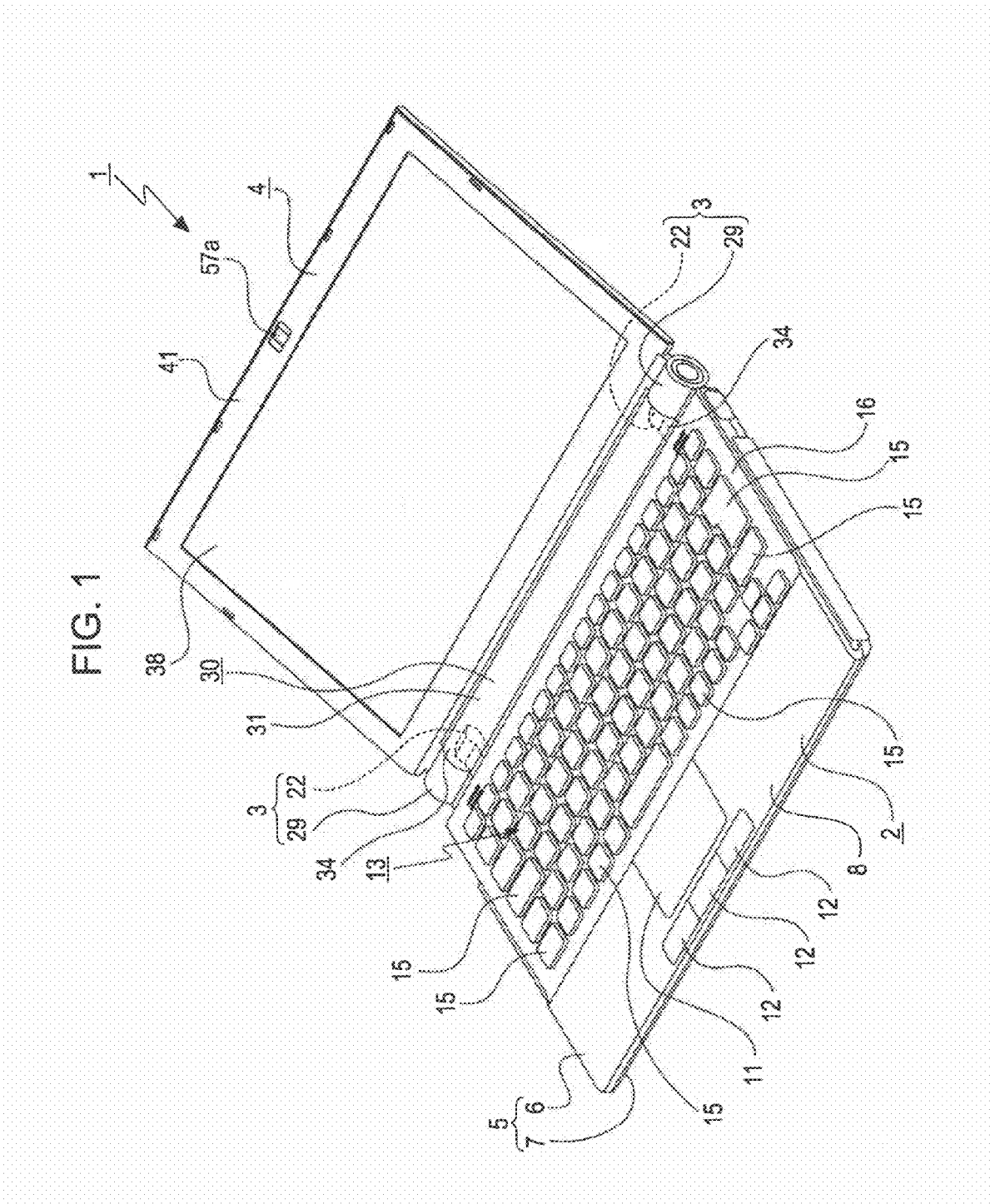
FIG. 1 illustrates a preferred embodiment of the present invention along with FIGS. 2 through FIG. 35, and is a perspective view of an electronic device illustrating a state in which a display portion is opened.
Figure 2:
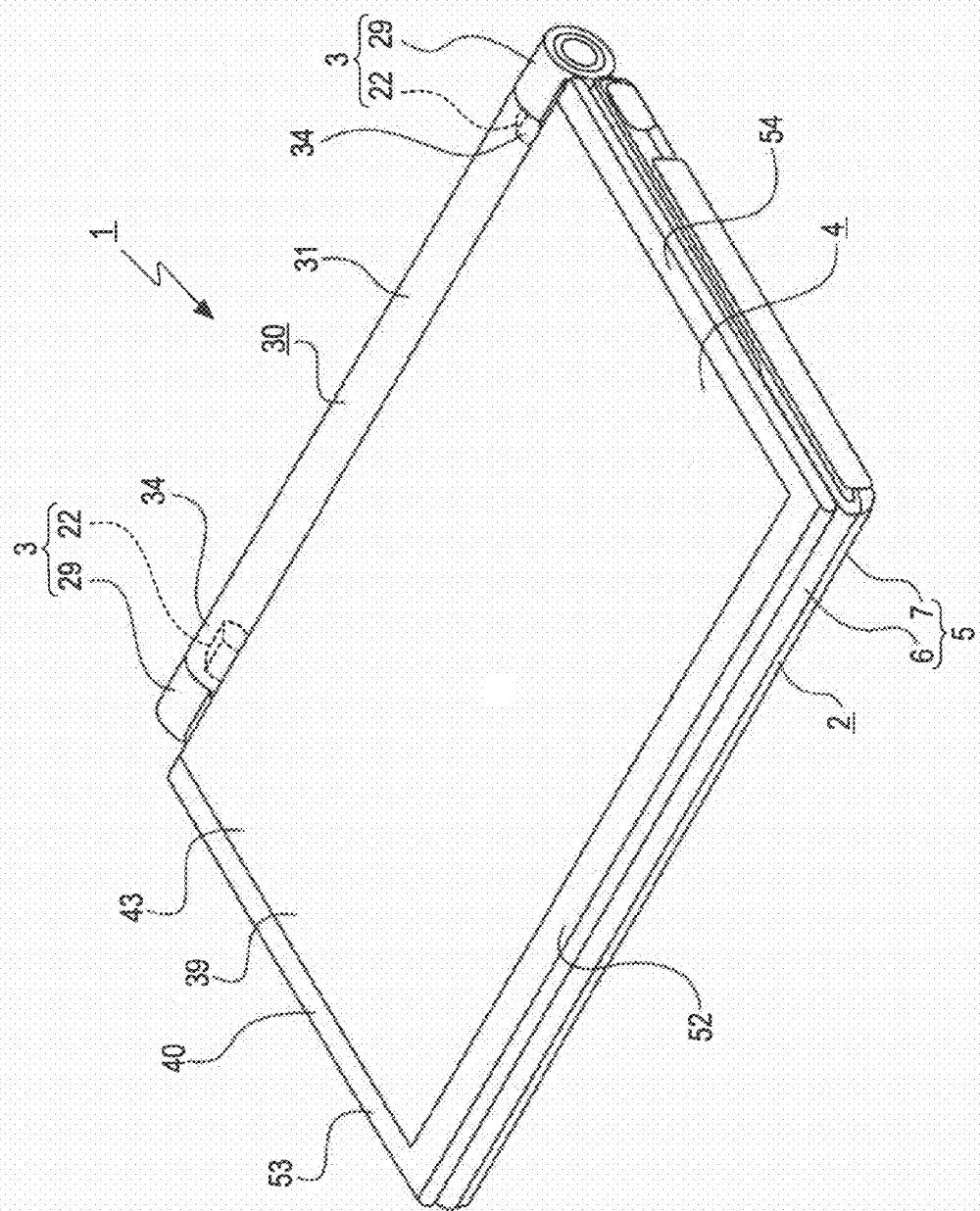
FIG. 2 is a perspective view of an electronic device illustrating a state in which the display portion is closed.

An electronic device, in this example, a personal computer 1 includes a display portion 4 supported with the rear edge portion of a device main frame portion 2 via hinge portions 3 so as to be rotationally movable (see FIGS. 1 and 2).

The device main frame portion 2 includes an unshown control circuit board (mother board) within a casing 5, and the casing 5 includes an upper case 6 and a lower case 7 connected vertically.

Figure 3:
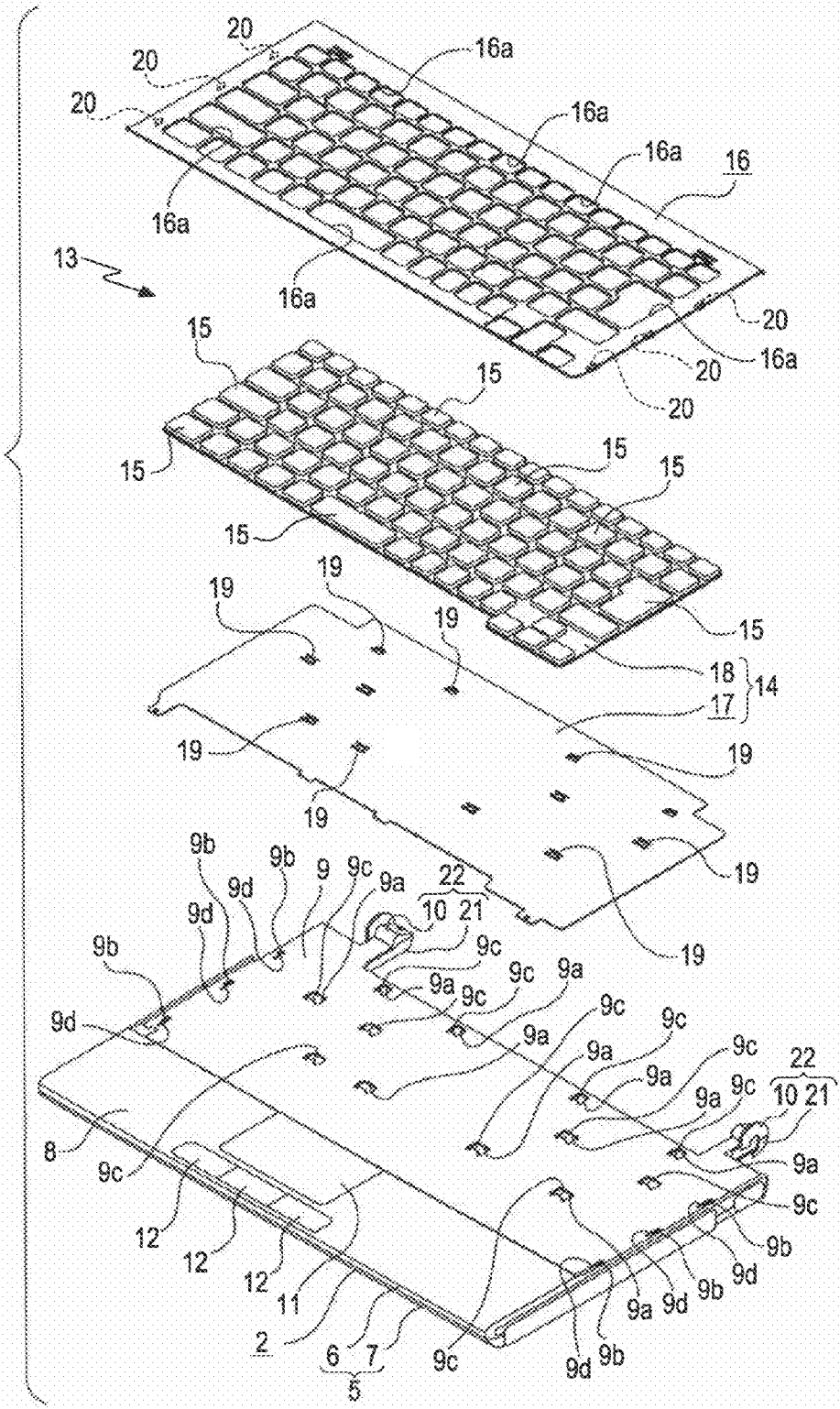
FIG. 3 is an exploded perspective view illustrating a keyboard and the upper case of a casing.

As shown in FIG. 3, the upper case 6 includes a palm rest portion 8 disposed on a front side, and a key array portion 9 consecutively disposed on a rear side of the palm rest portion 8. Protrusions for hinges 10 protruding backward are isolated and provided on either side of the rear edge of the key array portion 9 in the depicted example.

The palm rest portion 8 is formed in an approximate plate shape of a horizontally long rectangle, and at the approximate central portion of the palm rest portion 8, a pointing device 11 and click buttons 12 are disposed in the depicted example. The pointing device 11 is a touch-sensor type operating portion, and as for the click buttons 12, a left button, a middle button, and a right button are typically provided.

The key array portion 9 is typically formed in a shallow recessed shape. With the key array portion 9, multiple through holes 9a are formed at portions other than both side portions, and isolated insertion holes 9b are formed in the forward and backward directions on both side portions. At the opening edge portions of the through holes 9a of the key array portion 9, for example, tongue-shaped connection retaining portions 9c protruding backward are provided. At the opening edge portions of the through holes 9b of the key array portion 9, for example, tongue-shaped connection retaining portions 9d protruding backward are provided, respectively.

A keyboard 13 is disposed on and connected to the key array portion 9. The keyboard 13 includes a placement base 14, multiple operating keys 15 disposed on the placement base 14, and a keyboard cover 16 fixed to the placement base 14.

The placement base 14 includes a backing plate 17, an unshown circuit board formed on the backing plate 17, and a protective sheet 18 covering the circuit board from above.

Figure 4:
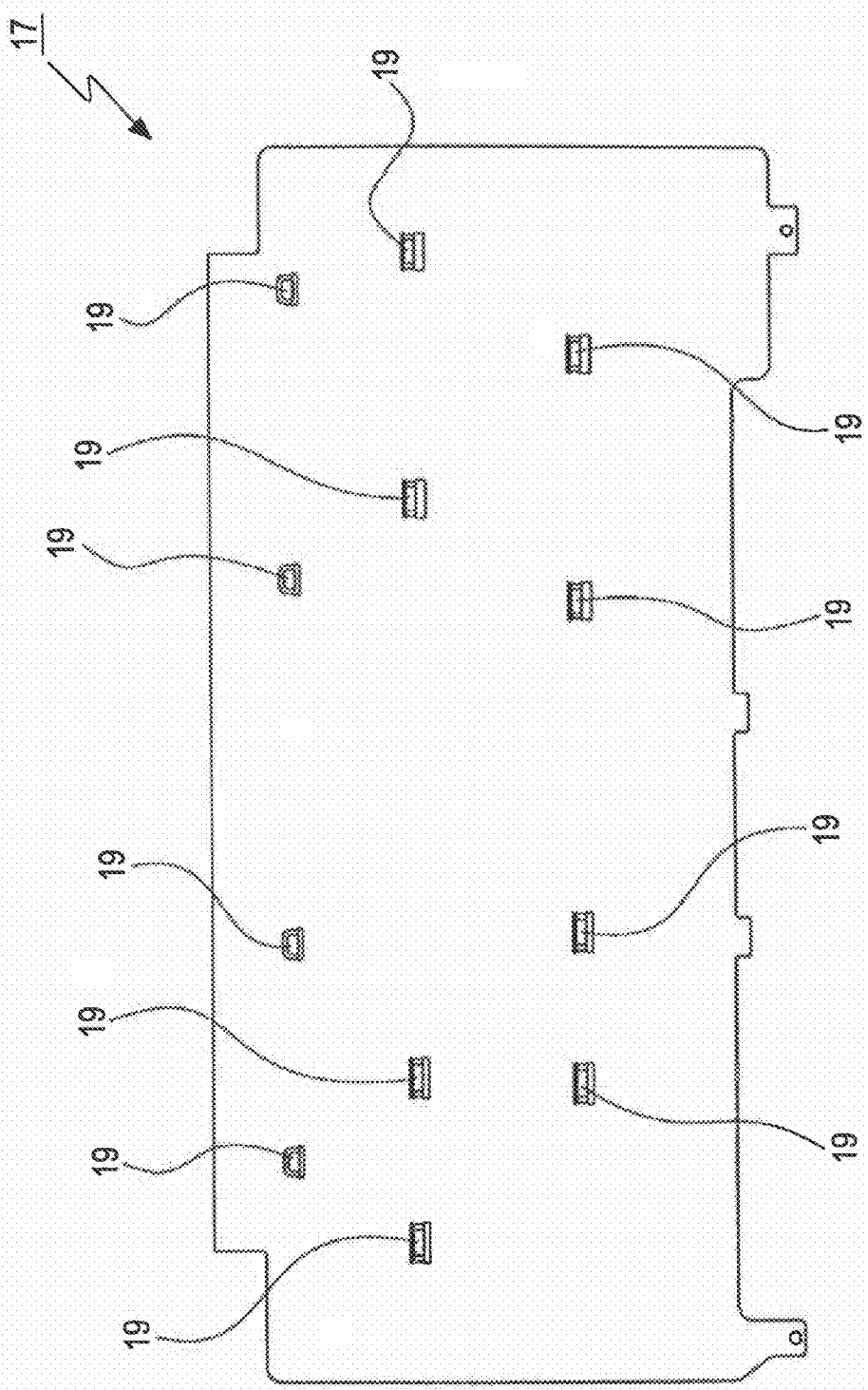
FIG. 4 is a bottom view of a backing plate.
Figure 5:
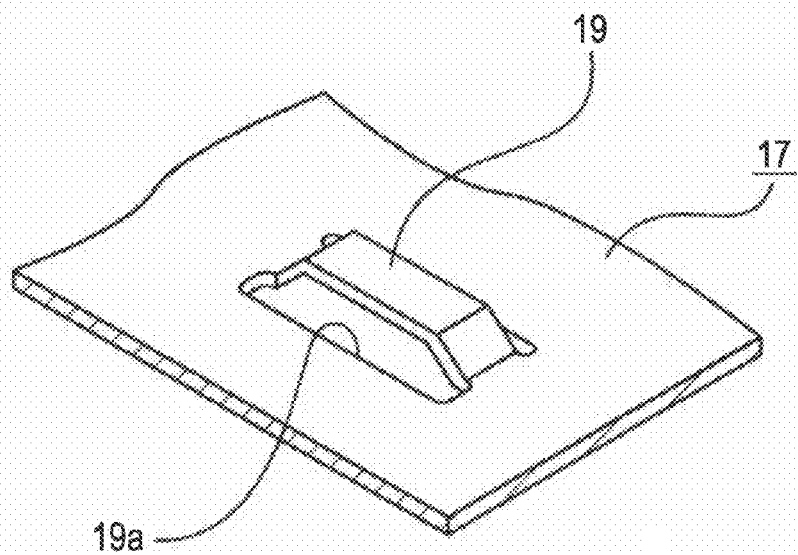
FIG. 5 is an enlarged perspective view illustrating a retaining portion provided on the backing plate.
Figure 6:
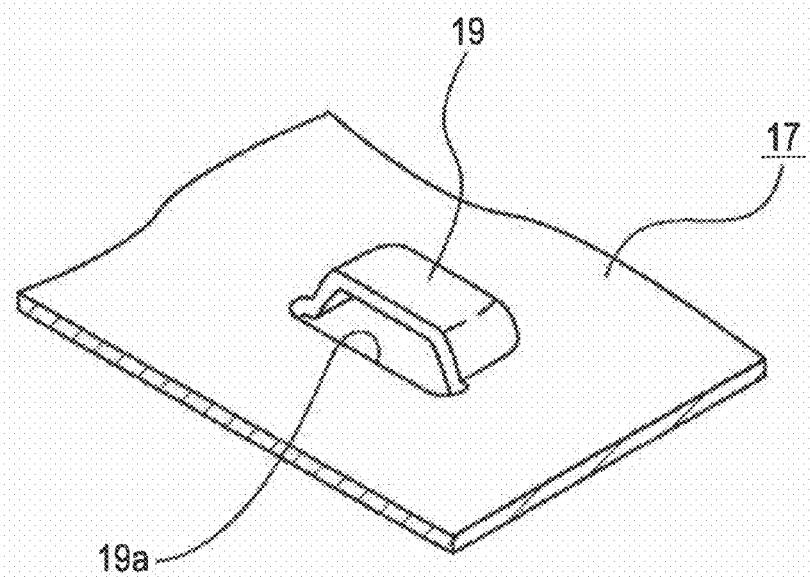
FIG. 6 is an enlarged perspective view illustrating another shape of the retaining portion provided on the backing plate.

The backing plate 17 includes, for example, a metal material such as aluminum or the like. At the underside of the backing plate 17, multiple retaining portions 19, protruding downward, are provided (see FIG. 4). The retaining portions 19 are formed by each part of the backing plate 17 being punched out downward. In an example shown in FIGS. 5 and 6, the retaining portions 19, are formed in an arch shape or sack-like shape, and have opening portions 19a which typically open in the forward direction, respectively.

The operating keys 15 are each movable vertically relative to the placement base 14. Movement is permitted by an unshown ascending/descending mechanism provided on the placement base 14. When the operating key 15 pressed downward, an operating signal corresponding to the operation thereof is generated by the circuit board formed on the backing plate 17.

Figure 7:
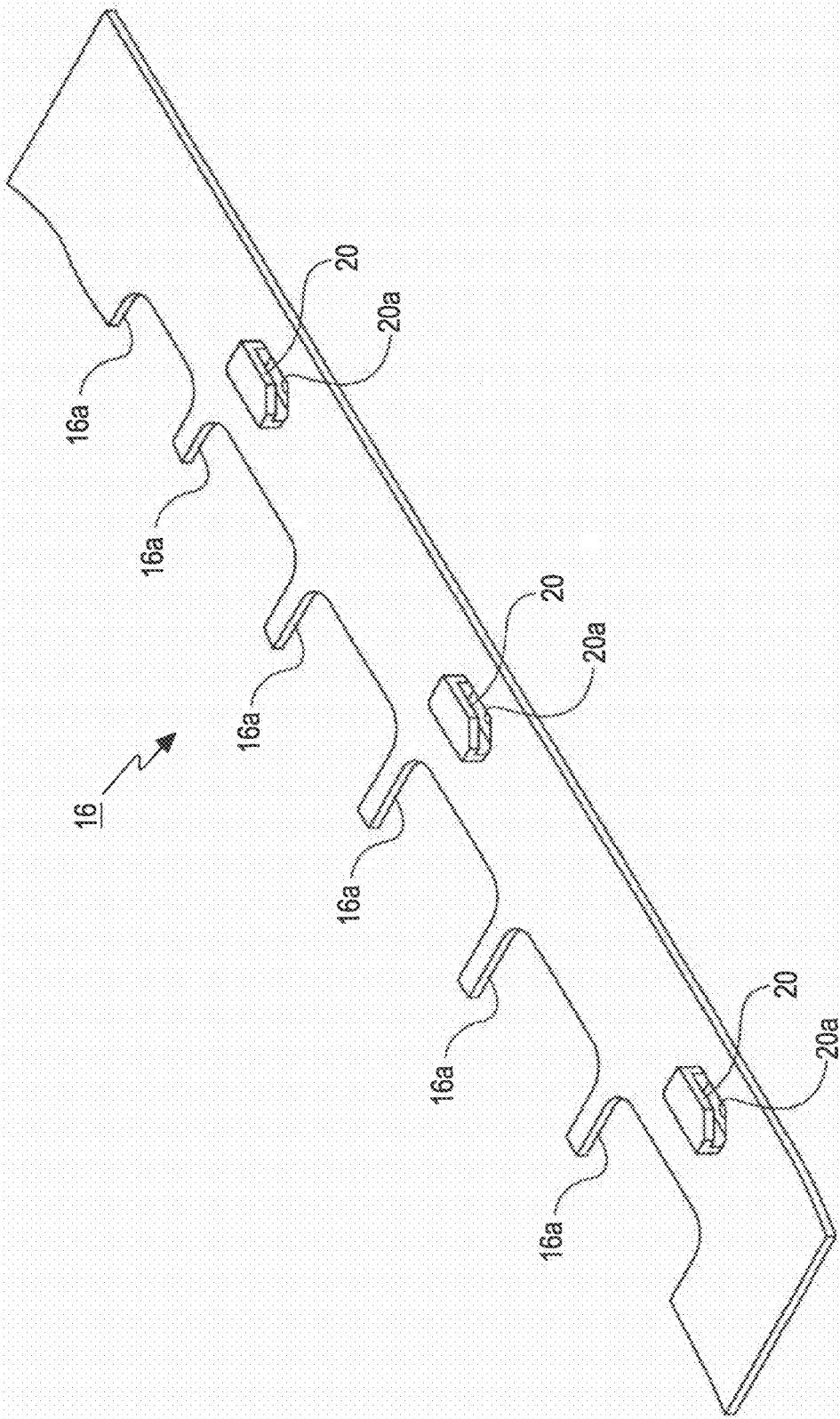
FIG. 7 is a perspective view of a keyboard cover.

The outer shape of the keyboard cover 16 is typically somewhat larger than the outer shape of the placement base 14 (see FIG. 3). Holes 16a each corresponding to the operating keys 15, are formed in the keyboard cover 16. At each of both side portions of the keyboard cover 16, as shown in FIG. 7, retaining portions 20 are provided, and at the retaining portions 20, opening portions 20a, which are opened forward and sideward, are formed, respectively.

The keyboard cover 16 is typically fixed to the placement base 14, for example, with welding. In a state in which the keyboard cover 16 is fixed to the placement base 14, operating keys 15 protrude upward from the holes 16a and the outer circumferential portion of the keyboard cover 16 is positioned outside of the placement base 14. Accordingly, the retaining portions 20 are positioned outside of the placement base 14.

The keyboard 13 is connected to the upper case 6 of the casing 5 as follows (see FIG. 8 through FIG. 11).

Figure 8:
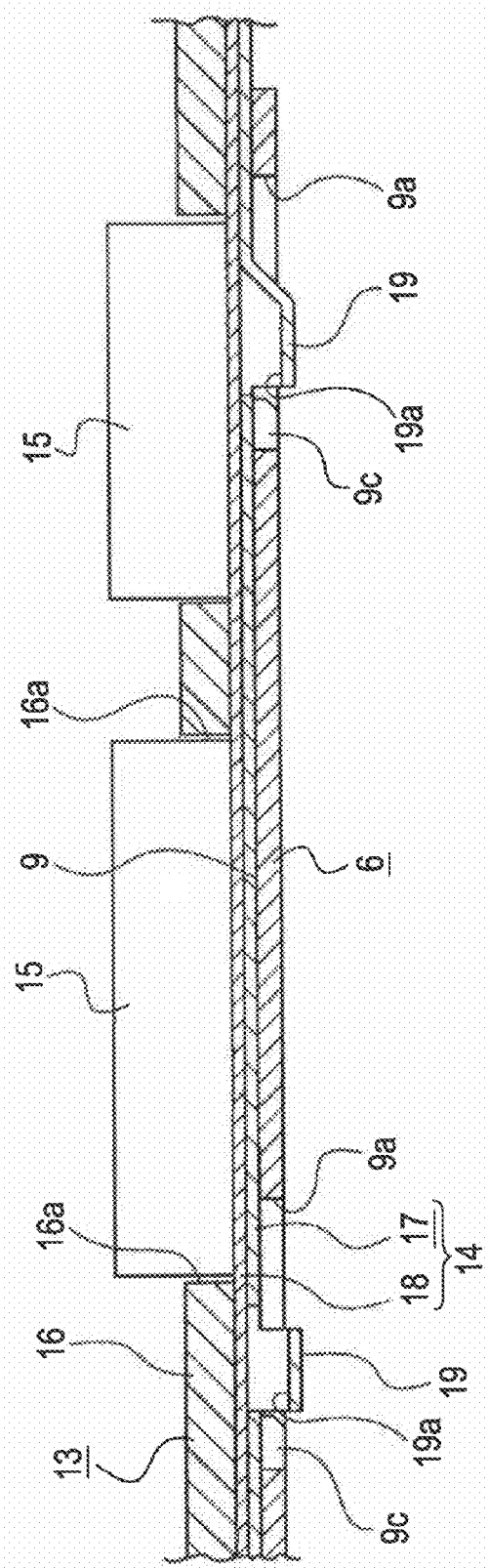
FIG. 8 illustrates connection procedures between the keyboard and the upper case along with FIGS. 9 through 11, and the present diagram is a schematic enlarged cross-sectional view illustrating a state in which the keyboard is overlapped on a key array portion of the upper case, and the retaining portions protrude from through holes.
Figure 9:
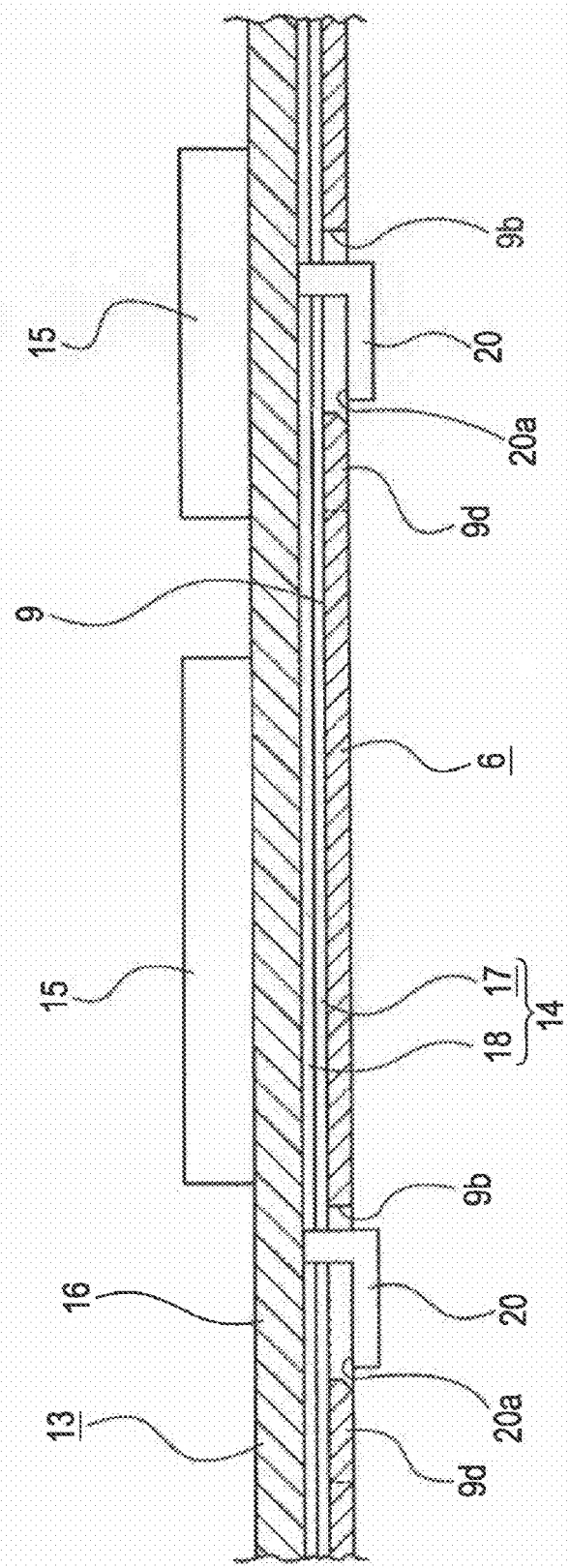
FIG. 9 is a schematic enlarged cross-sectional view illustrating a state in which the keyboard is overlapped on the key array portion of the upper case, and the retaining portions of the backing plate protrude from insertion holes.

First, the keyboard 13 is positioned to overlap the key array portion 9 of the upper case 6, and as shown in FIGS. 8 and 9, the retaining portions 19 of the placement base 14 protrude downward from the through holes 9a of the key array portion 9 respectively. The retaining portions 20 of the keyboard cover 16 protrude downward from the insertion holes 9b of the key array portion 9 respectively.

Figure 10:
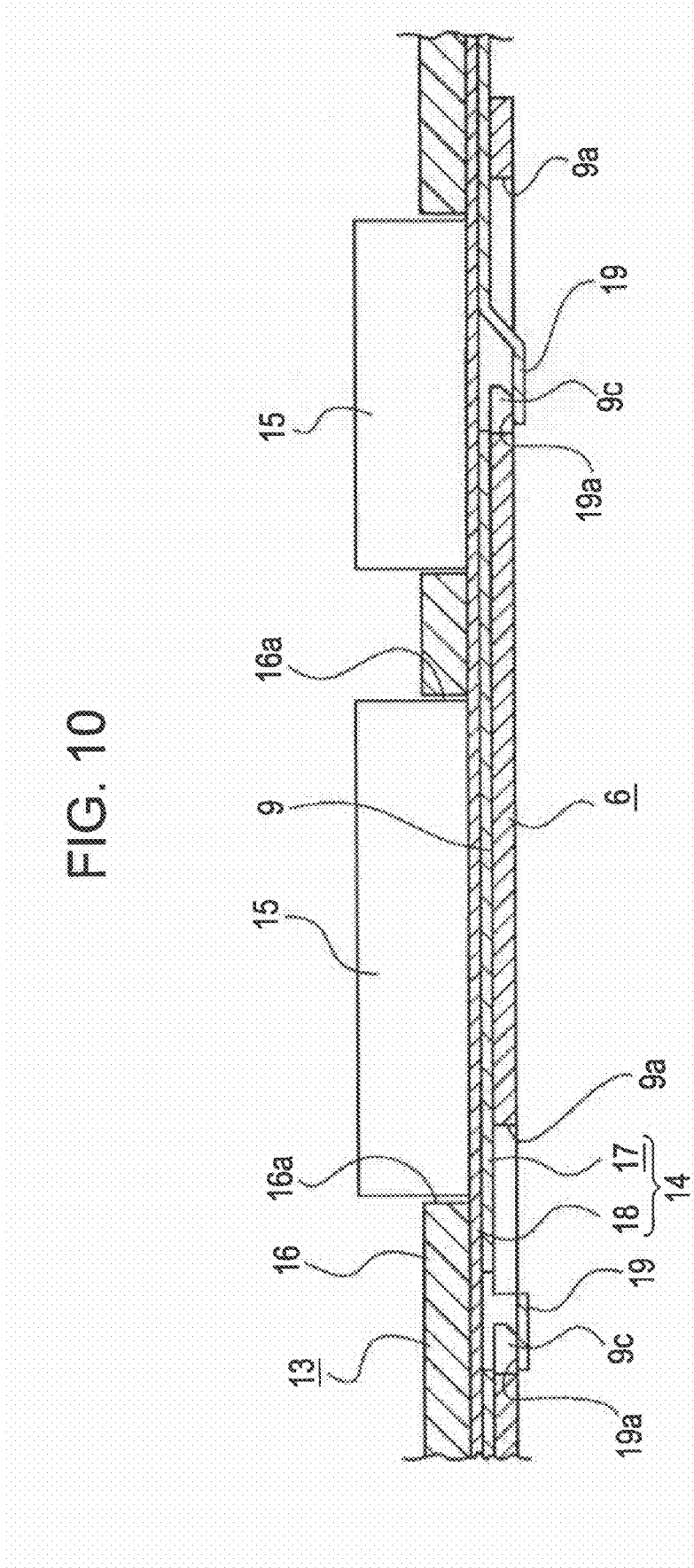
FIG. 10 is an enlarged cross-sectional view illustrating a state in which the keyboard slides as to the upper case, and the retaining portions of the keyboard cover are retained with connection retaining portions.
Figure 11:
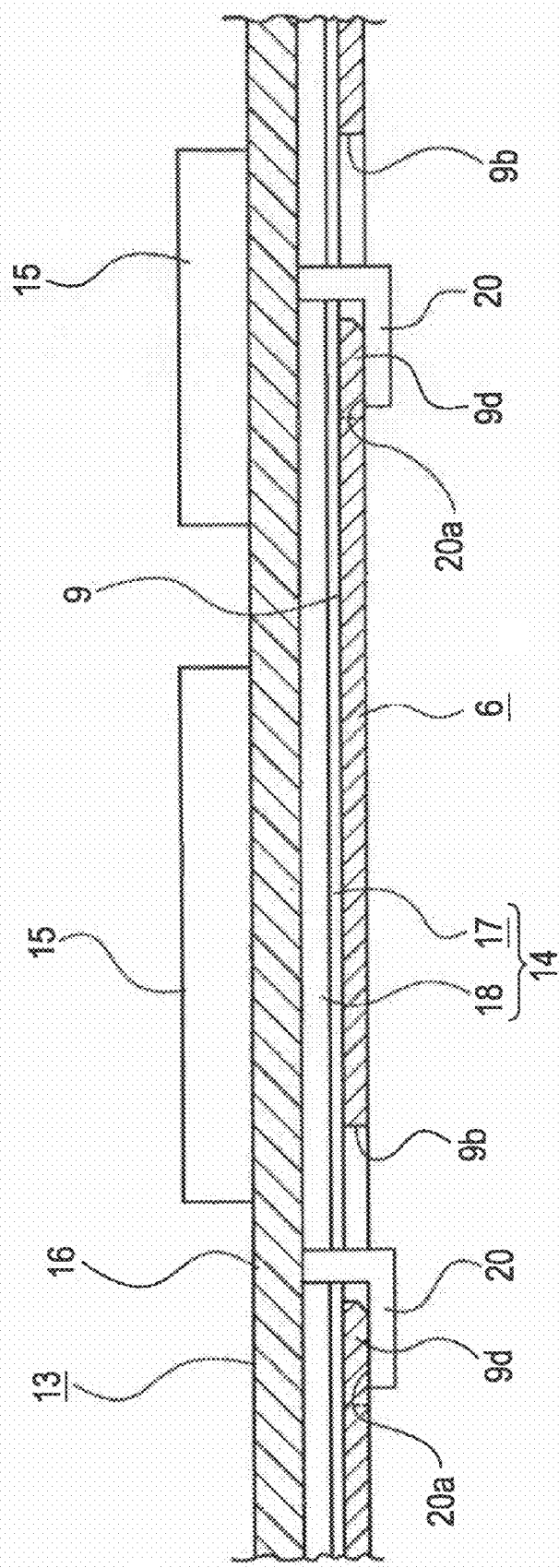
FIG. 11 is an enlarged cross-sectional view illustrating a state in which the keyboard slides as to the upper case, and the retaining portions provided at both side edge portions are retained with connection retaining portions.

Next, upon making the keyboard 13 slide forward relative to the upper case 6, as shown in FIGS. 10 and 11, the connection retaining portions 9c are inserted in the opening portions 19a of the retaining portions 19, respectively, and the retaining portions 19 are retained with the connection retaining portions 9c respectively. The connection retaining portions 9d are inserted in the opening portions 20a of the retaining portions 20 respectively. The retaining portions 20 are retained with the connection retaining portions 9d respectively, and thus, the keyboard 13 is connected to the upper case 6.

As described above, with the electronic device 1, the retaining portions 19 and 20, provided on the outer circumferential portions and the portions other than the outer circumferential portions of the keyboard 13 are retained, and the keyboard 13 is connected to the casing 5, whereby a strong connection state between the keyboard 13 and casing 5 can be provided, and an excellent operating feeling when pressing the operating keys 15 can be achieved without providing a state in which the keyboard 13 floats above the upper case 6.

Also, connection between the keyboard 13 and casing 5 is typically carried out only by retaining the retaining portions 19 and 20 with the connection retaining portions 9c and 9d, so the keyboard 13 is typically not connected to the casing 5 using screw clamps. Thus, disassembly of the keyboard 13 from the casing 5 can readily be performed, and improvement in maintenance can be achieved.

Further, connection of the keyboard 13 to the casing 5 can be performed by overlapping the keyboard 13 on the key array portion 9 and making the keyboard 13 slide, whereby connection of the keyboard 13 to the casing 5 can readily be performed. Accordingly improvement in workability in the assembling work of the electronic device 1 can be achieved.

Additionally, with the keyboard 13, the keyboard cover 16 fixed to the placement base 14 is provided, whereby the rigidity of the keyboard 13 and device main frame portion 2 can be enhanced.

Figure 12:
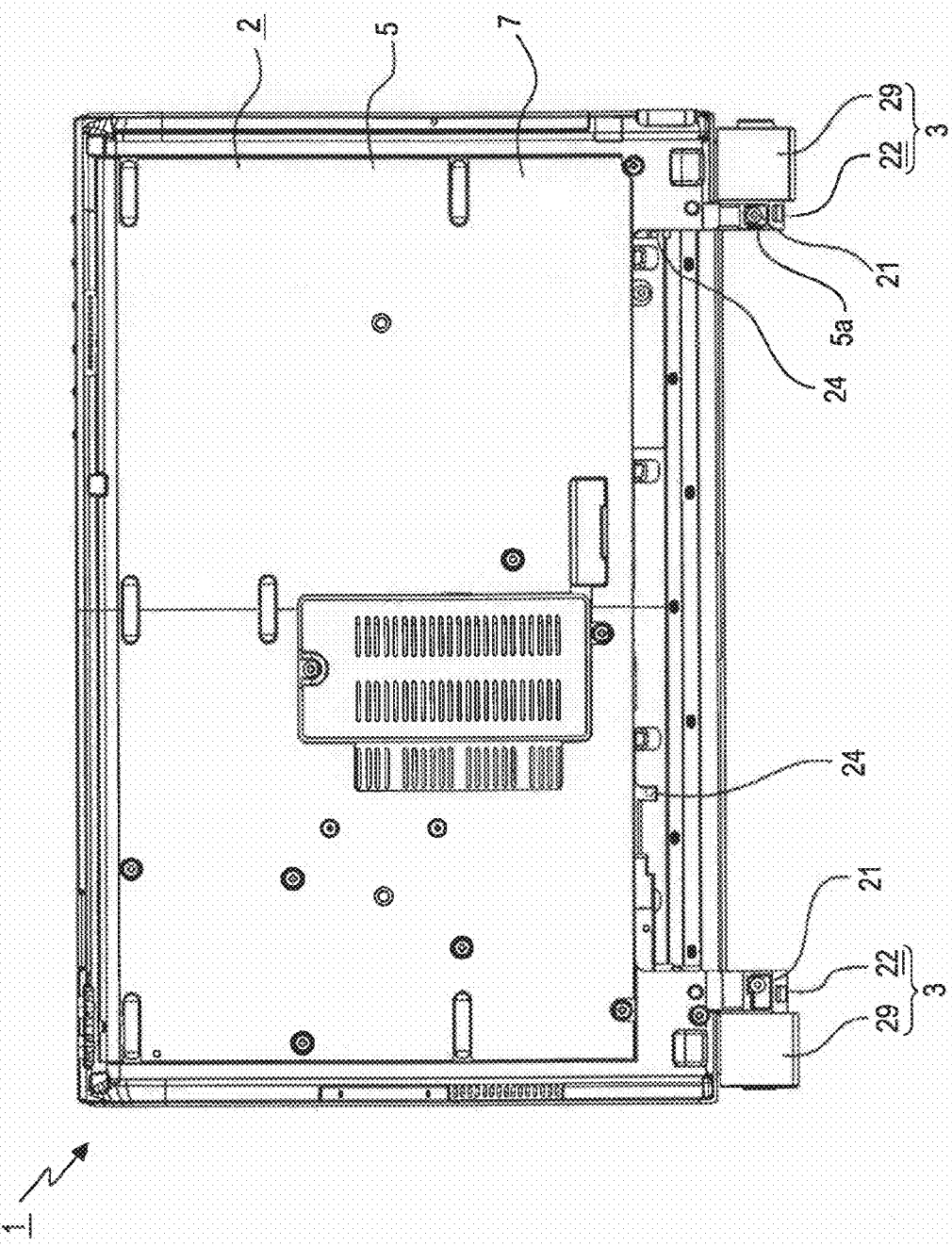
FIG. 12 is a bottom view of the electronic device illustrating a state in which the display portion is closed.
Figure 13:
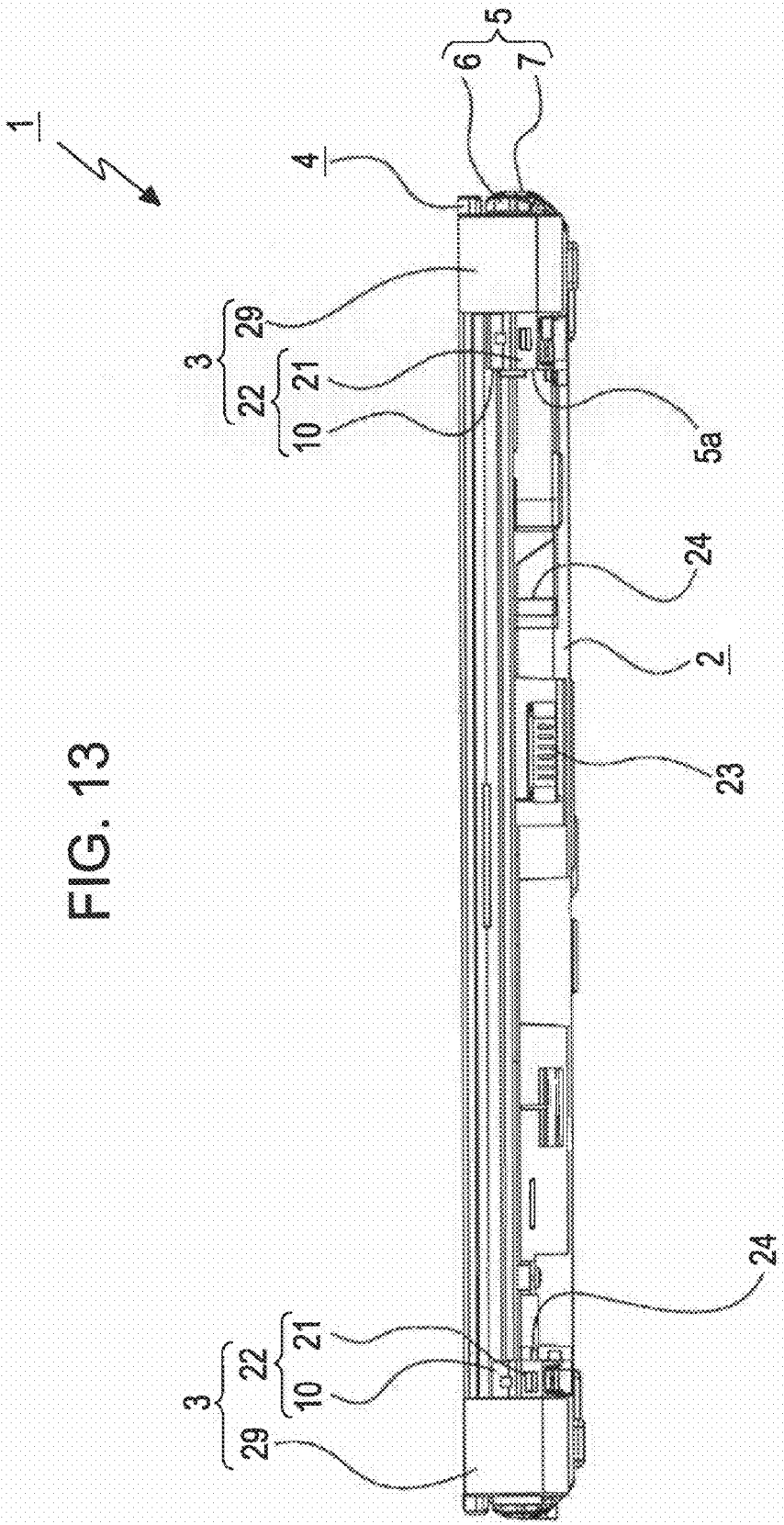
FIG. 13 is a rear view of the electronic device illustrating a state in which the display portion is closed.

In the lower case 7 of the casing 5, protrusions for hinges 21 and 21 protruding backward from the rear face are isolated and provided on either side (see FIGS. 12 and 13). The lower case 7 is attached to the upper case 6, and the protrusions for hinges 10 of the upper case 6 and the protrusions for hinges 21 of the lower case 7 are connected vertically, thereby providing supporting protrusions 22.

A recessed portion for battery placement 5a which is opened backward and downward is formed at the rear face of the casing 5. A connector 23 is provided at the recessed portion for battery placement 5a (see FIG. 13). Both side faces of the recessed portion for battery placement 5a of the casing 5 are provided with attachment pieces 24 respectively (see FIGS. 12 and 13).

Figure 14:
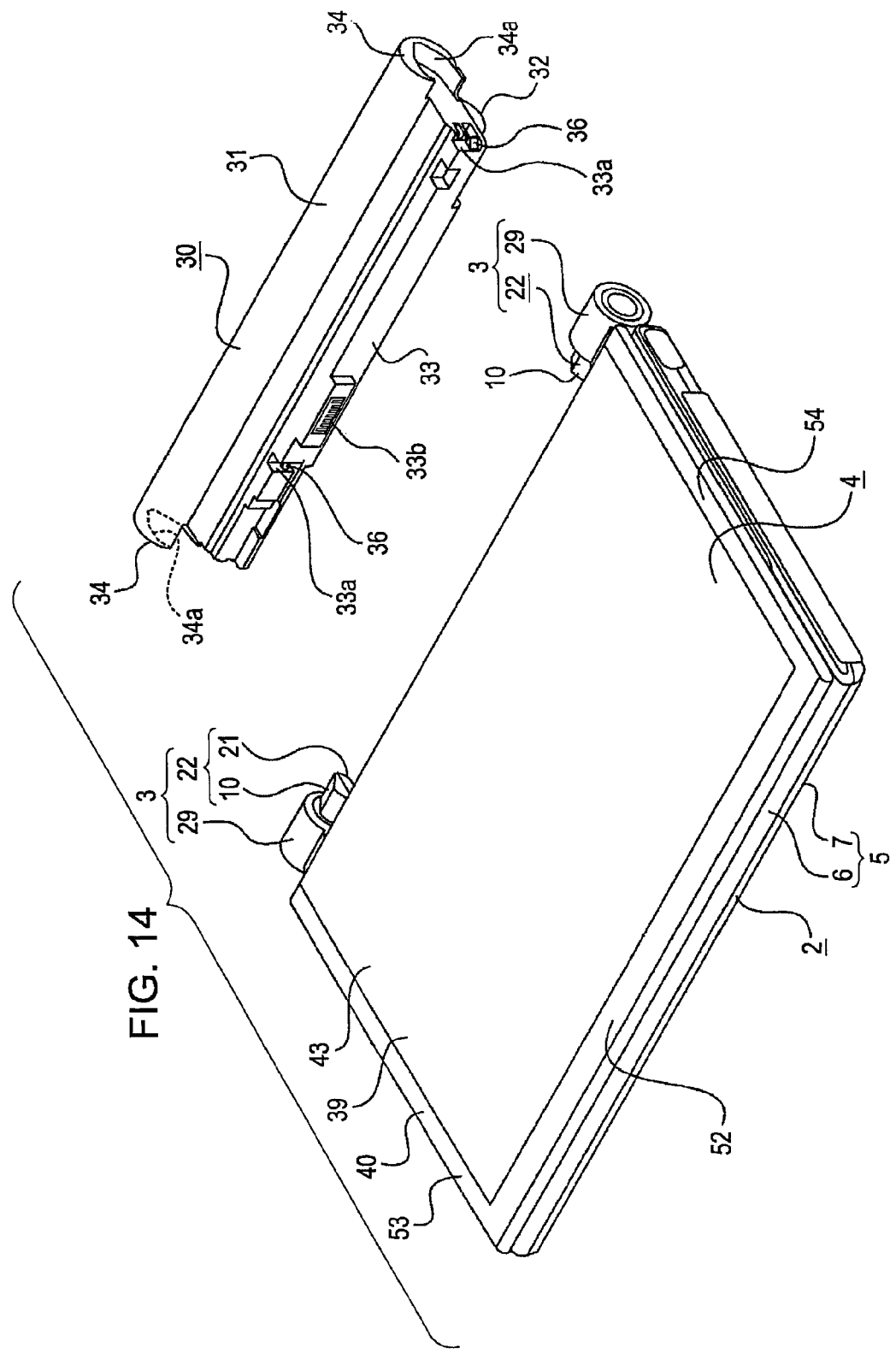
FIG. 14 is a perspective view illustrating a state in which a battery is detached form the device main frame portion.
Figure 15:
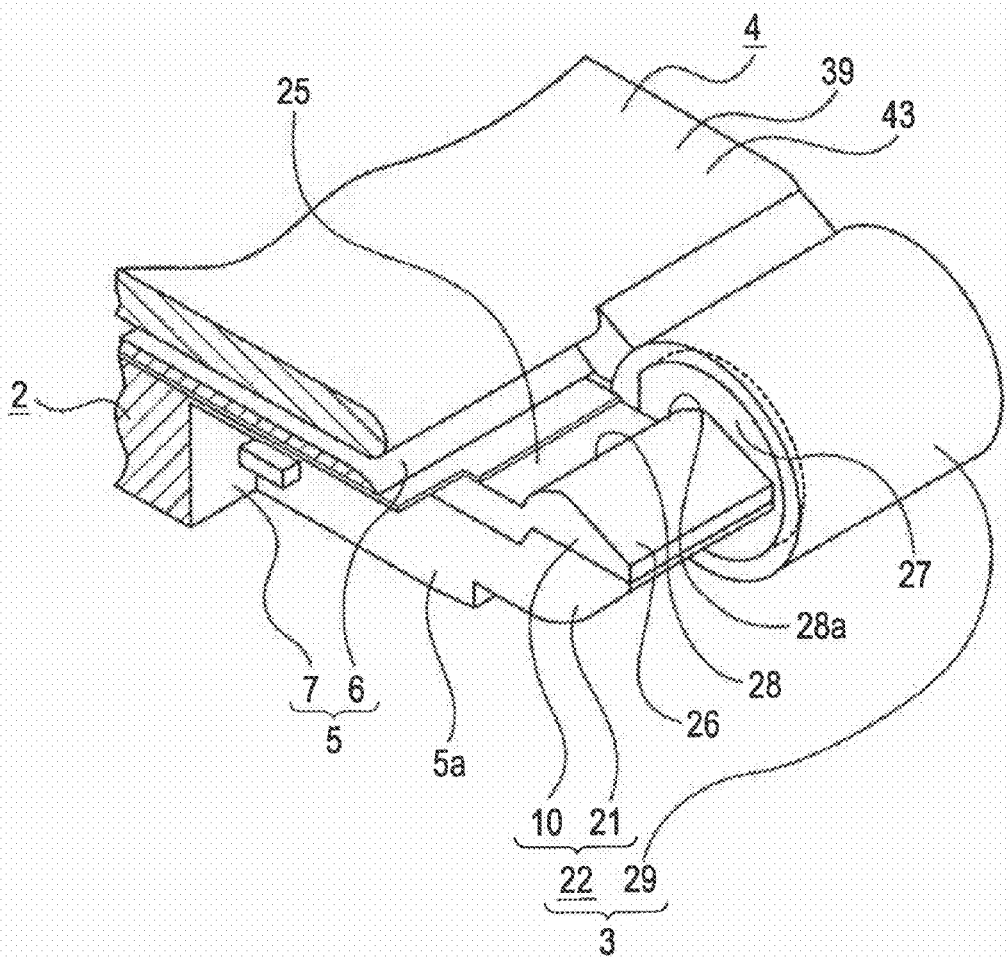
FIG. 15 is an enlarged perspective view of a supporting protrusion.

The supporting protrusions 22 are typically disposed on both sides of the recessed portion for battery placement 5a, respectively (see FIGS. 12 through 14). The supporting protrusion 22 includes, as shown in FIG. 15, a base portion 25 protruding backward, an insertion portion 26 disposed consecutively at the rear edge of the base portion 25, and a flange-shaped projecting portion 27 provided at the side face of the outer side of the insertion portion 26.

The insertion portion 26 is formed such that the vertical width becomes small as the position thereof advances backward, and an upper edge portion 28 is positioned above the upper face of the base portion 25, and the upper face 28a of the upper portion 28 is formed in an approximate arc shape protruding upward.

Supported protrusions 29 protrude from both side edge portions of the lower edge portion of the display portion 4, which is supported at the device main frame portion 2 so as to be rotationally movable (see FIGS. 1, 2, and 12). The supported protrusions 29 are supported by the supporting protrusions 22 so as to be rotationally movable, respectively. In a state in which the supported protrusions 29 are supported by the supporting protrusions 22, the projecting portions 27 of the supporting protrusions 22 are closed from the outer side of the casing 5 by the supported protrusions 29 (see FIGS. 12 through 14).

Hinge portions 3 are comprised of the supporting protrusions 22 and the supported protrusions 29 (see FIGS. 1 and 2). The display portion 4 is supported at the device main frame portion 2 via the hinge portions 3 so as to be rotationally movable.

A battery 30 is attached to the device main frame portion 2, and a part of the battery 30 is disposed between the hinge portions 3 (see FIGS. 2 and 14).

Figure 16:
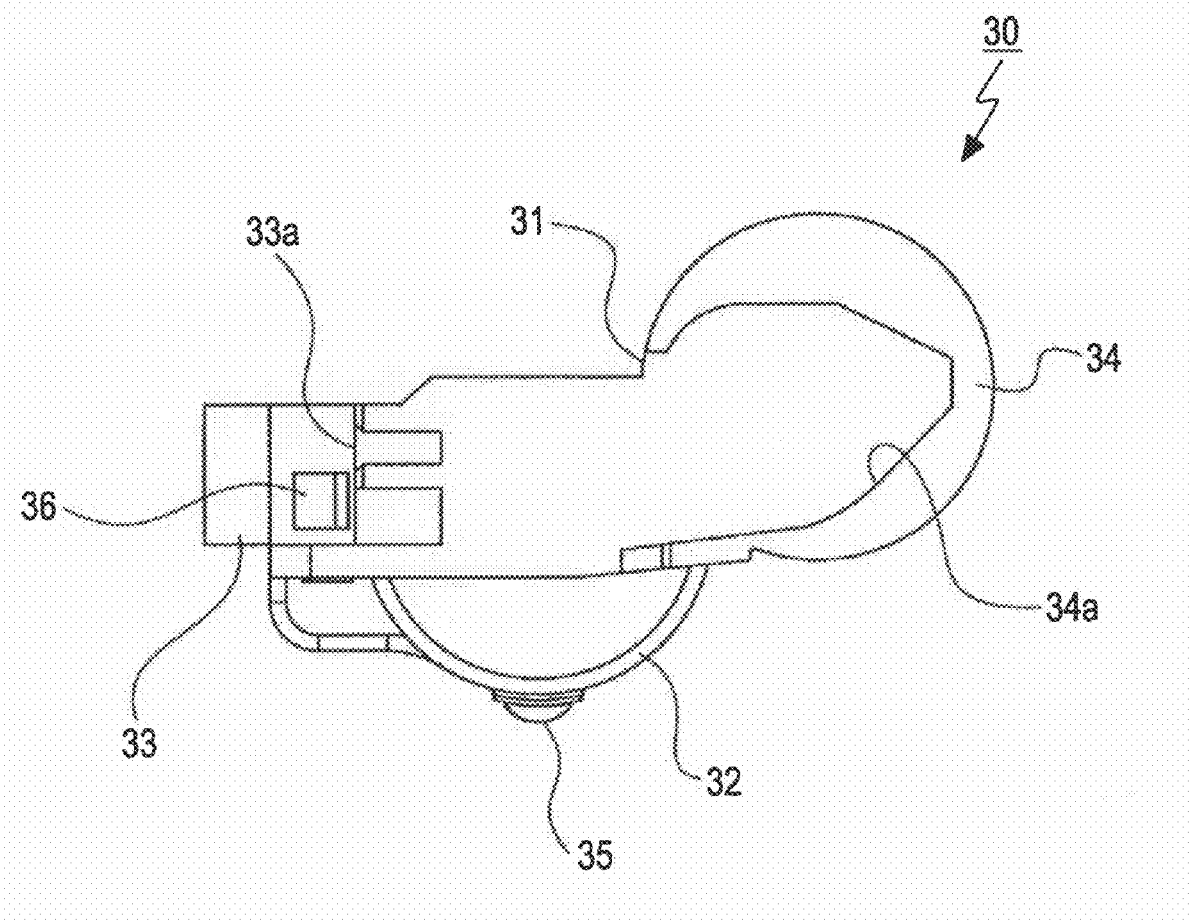
FIG. 16 is an enlarged side view of the battery.

The battery 30 includes, as shown in FIGS. 14 and 16, a horizontally long first cell placement portion 31 of which the cross-sectional shape is typically formed in an approximate cylindrical shape, a second cell placement portion 32 of which a lower side half of the cross-sectional shape is typically formed in an approximate semi-cylindrical shape, and a board placement portion 33 where an unshown control circuit board for charging the battery is disposed. The second cell placement portion 32 is provided consecutively at the front side of the first cell placement portion 31, and a lower side half thereof is disposed below the first cell placement portion 31. The board placement portion 33 is provided consecutively at the front side of the second cell placement portion 32.

The first cell placement portion 31 and second cell placement portion 32 generally have the same length in the horizontal direction, and each typically stores three unshown charging batteries (cells) therein.

Cover portions 34 are each provided integrally with both side edge portions of the first cell placement portion 31. With the cover portion 34, the outer face is formed in an arc shape which continues to the first cell placement portion 31, and the inner side includes an insertion groove 34a which opens forward. The insertion groove 34a is formed in the same shape as the shape of the insertion portion 25 of the supporting protrusion 22.

The outer diameter of the cover portions 34 is formed in the same size as the outer diameter of the supported protrusions 29 protruding backward from the display portion 4.

At the underside of the second cell placement portion 32, receiving protrusions 35, typically made up of a flexible material, such as rubber or the like, are isolated and provided on either side.

Figure 17:
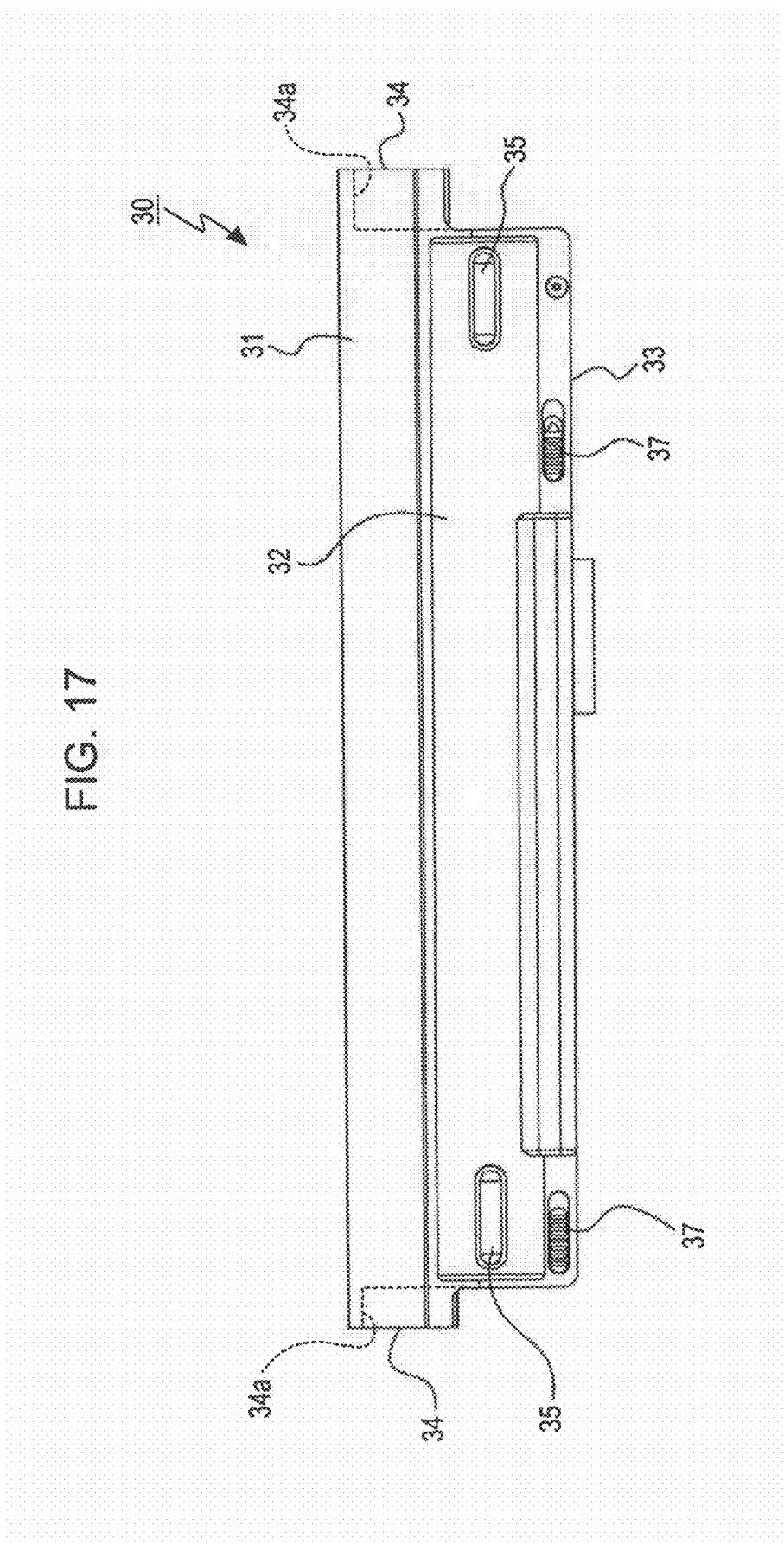
FIG. 17 is a bottom view of the battery.

At the front edge portion of the board placement portion 33, notched portions 33a, which are isolated on either side and opened at least forward, are formed, and the notched portions 33a are disposed with engagement pawls 36 respectively. At the underside of the board placement portion 33, release levers 37 are isolated on either side and provided so as to slide (see FIG. 17). The release levers 37 are made to slide in one direction, whereby the engagement pawls 36 (see FIG. 18) disposed at the notched portions 33a are drawn toward the inner portion of the board placement portion 33. The engagement pawls 36 are pressed in the direction drawn in the notched portions 33a by unshown spring members.

At the board placement portion 33, a connector portion 33b protruding forward is provided (see FIG. 14).

Description will be made below regarding procedures for attaching the battery 30 to the device main frame portion 2 (see FIGS. 18 through 23).

Figure 18:
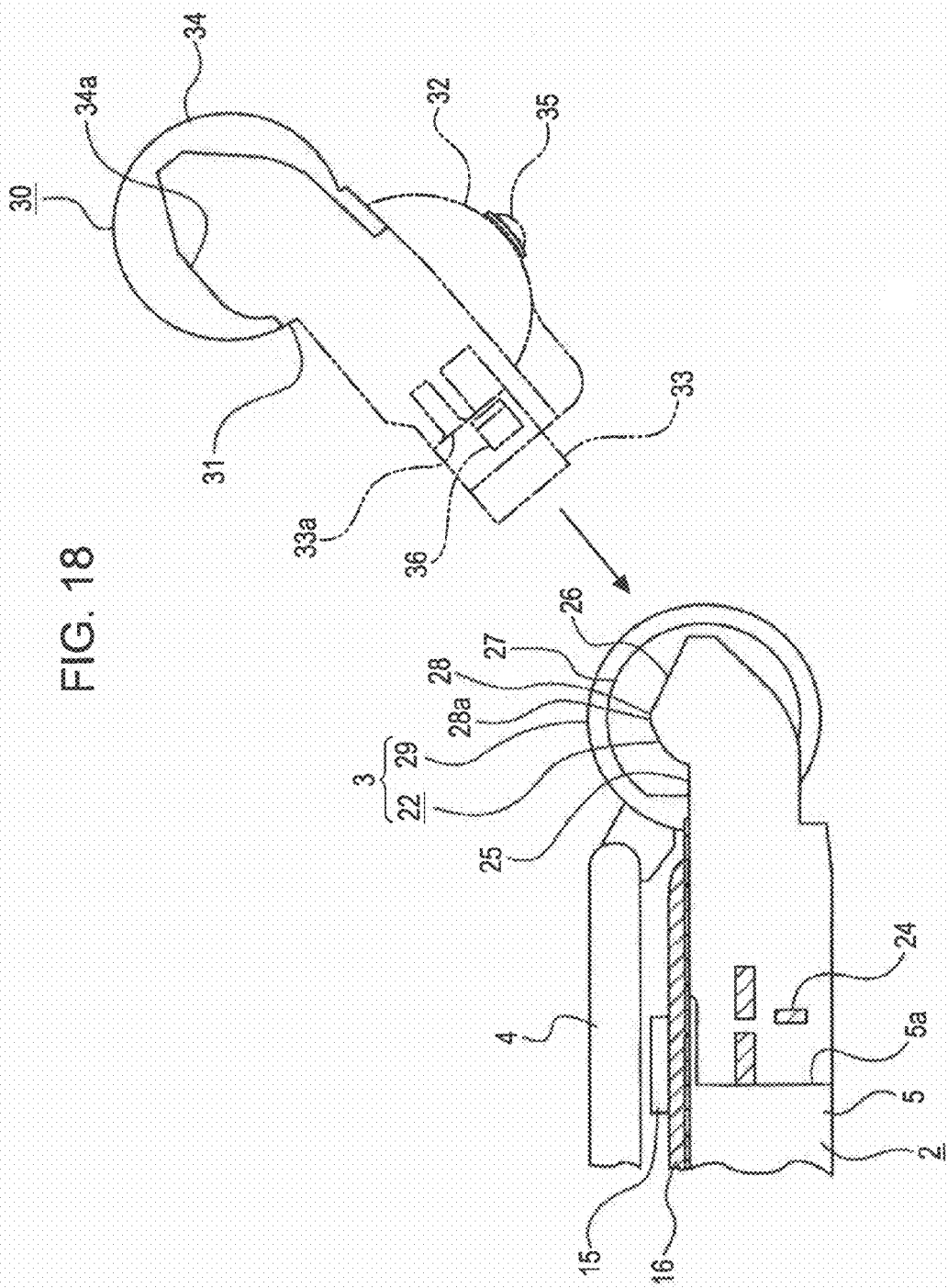
FIG. 18 illustrates connection procedures between the battery and the device main frame portion along with FIGS. 19 through 25, and the present diagram is a schematic enlarged cross-sectional view illustrating a state in which the cover portion is inclined obliquely.

First, the battery 30 is inclined such that the opening direction of the cover portions 34 is directed toward a front downward slanting portion (see FIG. 18).

Figure 19:
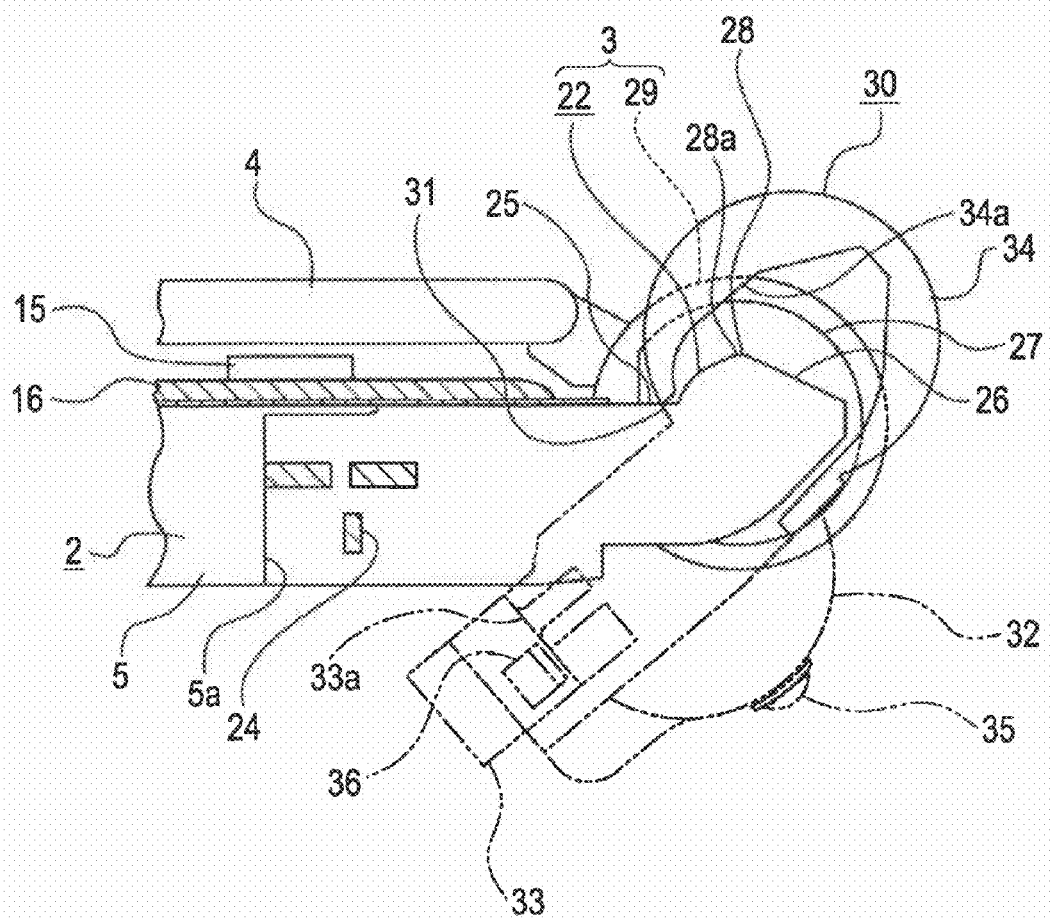
FIG. 19 is a schematic cross-sectional view illustrating a state in which the battery is moved to a front slanting lower portion, and a supporting protrusion is inserted in an insertion groove.

Next, the battery 30 is moved toward a front downward slanting portion, and the supporting protrusions 22 are inserted in the insertion grooves 34a (see FIG. 19).

Figure 20:
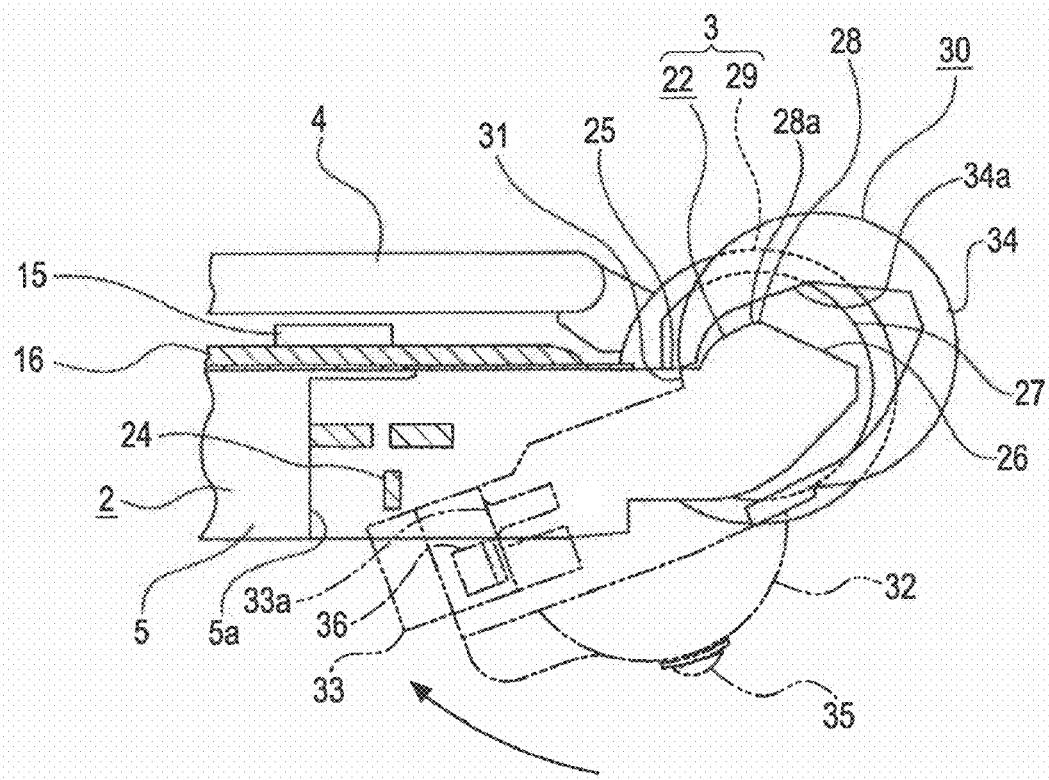
FIG. 20 is a schematic cross-sectional view illustrating a state in the middle of rotating the battery.
Figure 21:
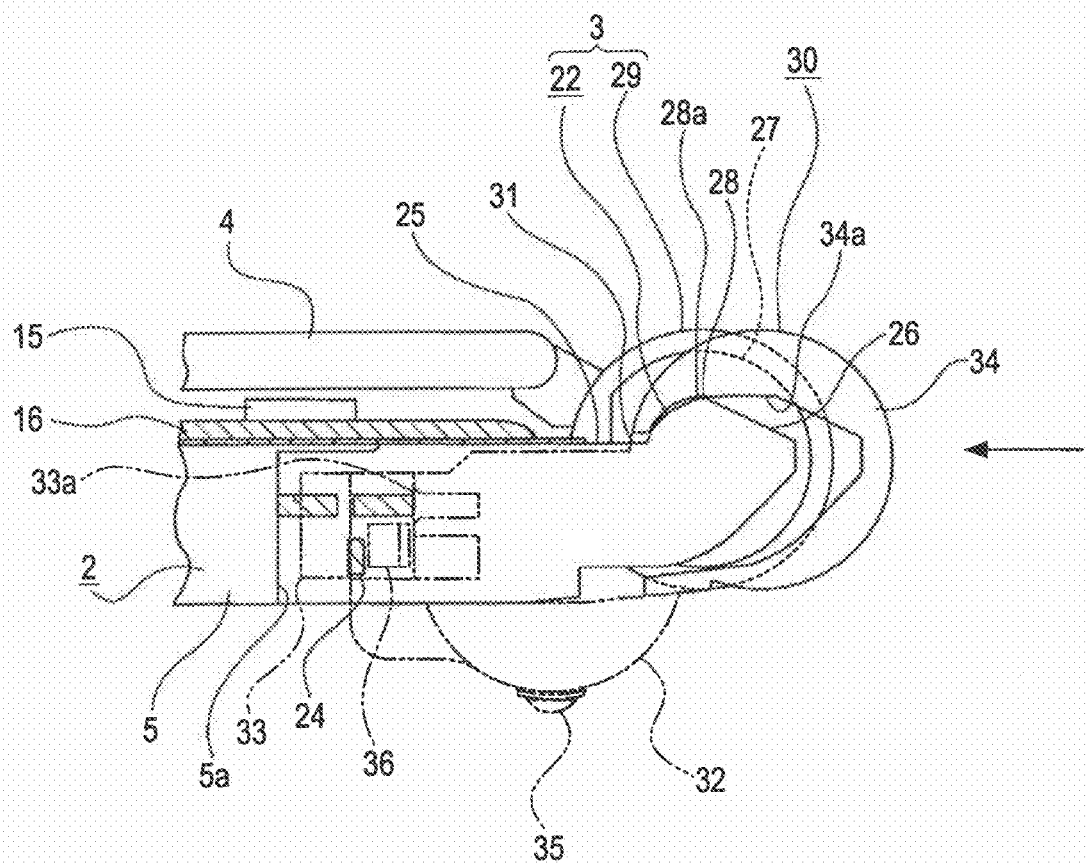
FIG. 21 is a schematic cross-sectional view illustrating a state of the battery being rotated.

Subsequently, the battery 30 is rotated such that the opening direction of the cover portions 34 is directed forward (see FIGS. 20 and 21). At this time, even if the hand which was grasping the battery 30 separates from the battery 30, the supporting protrusions 22 are inserted in the insertion grooves 34a of the cover portions 34 respectively, whereby the battery 30 can be prevented from dropping and falling from the supporting protrusions 22. In particular, the upper faces 28a of the upper edge portions 28 of the supporting protrusions 22 are formed in an approximate arc shape protruding upward, and accordingly the cover portions 34 are readily held by the upper edge portions 28 respectively, and the battery 30 can be prevented from dropping from the supporting protrusions 22.

Figure 22:
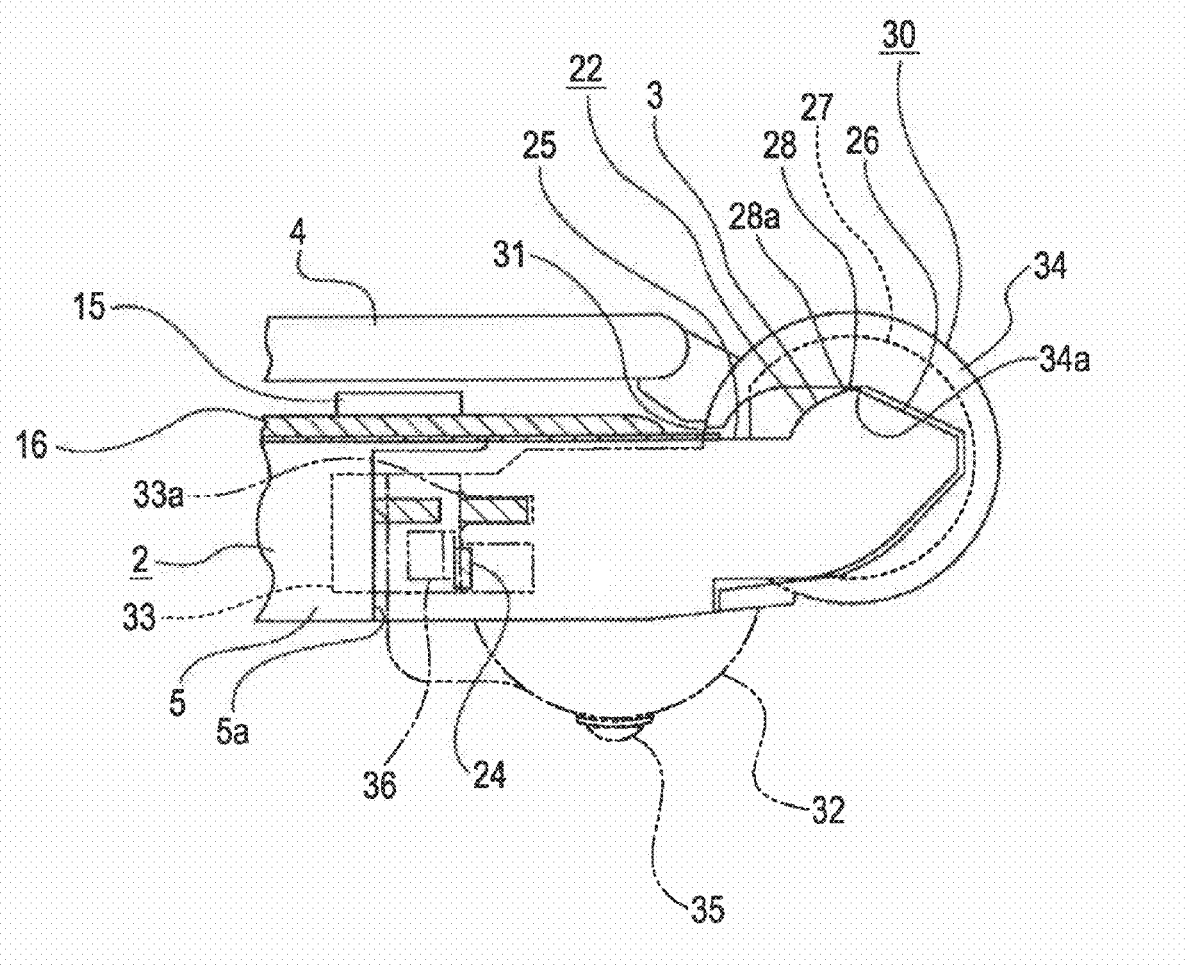
FIG. 22 is a schematic cross-sectional view illustrating a state in which the battery is attached to the device main frame portion.
Figure 23:
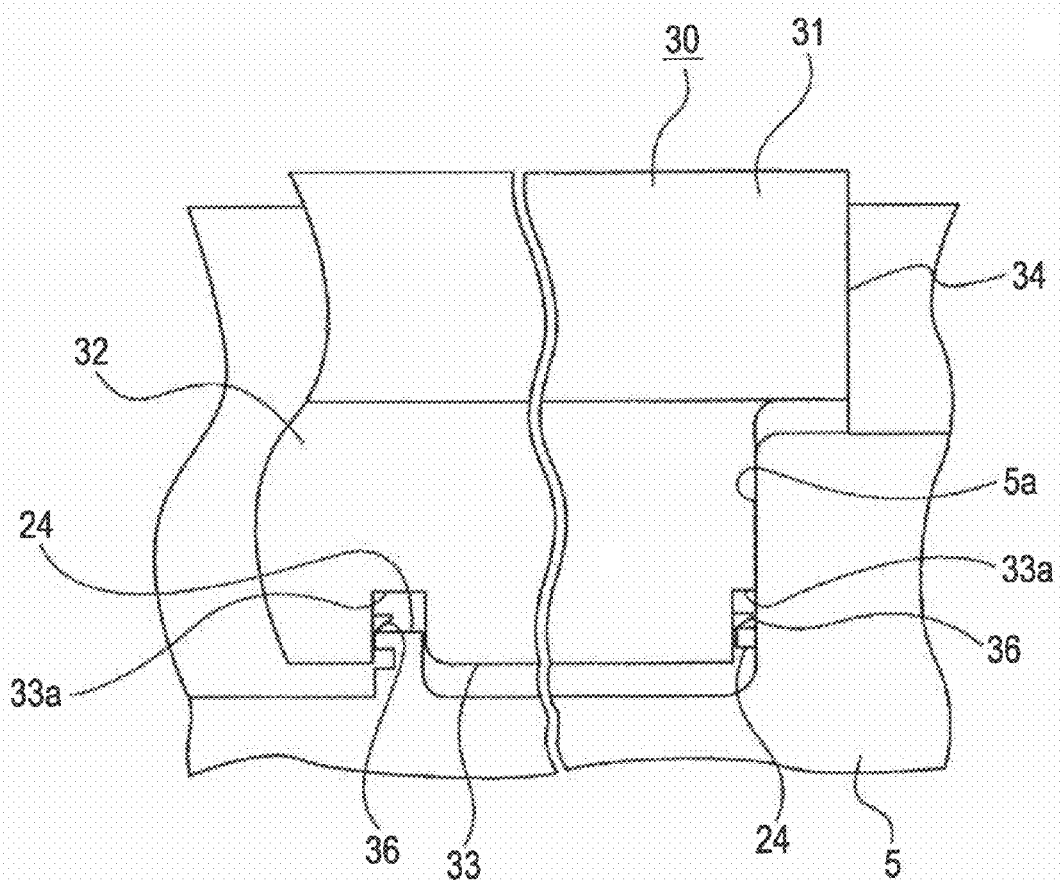
FIG. 23 illustrates the sequence when the battery is locked with the device main frame portion along with FIGS. 24 and 25, and the present diagram is a schematic enlarged plan view illustrating a state in which engagement pawls come into contact with attachment pieces.
Figure 24:
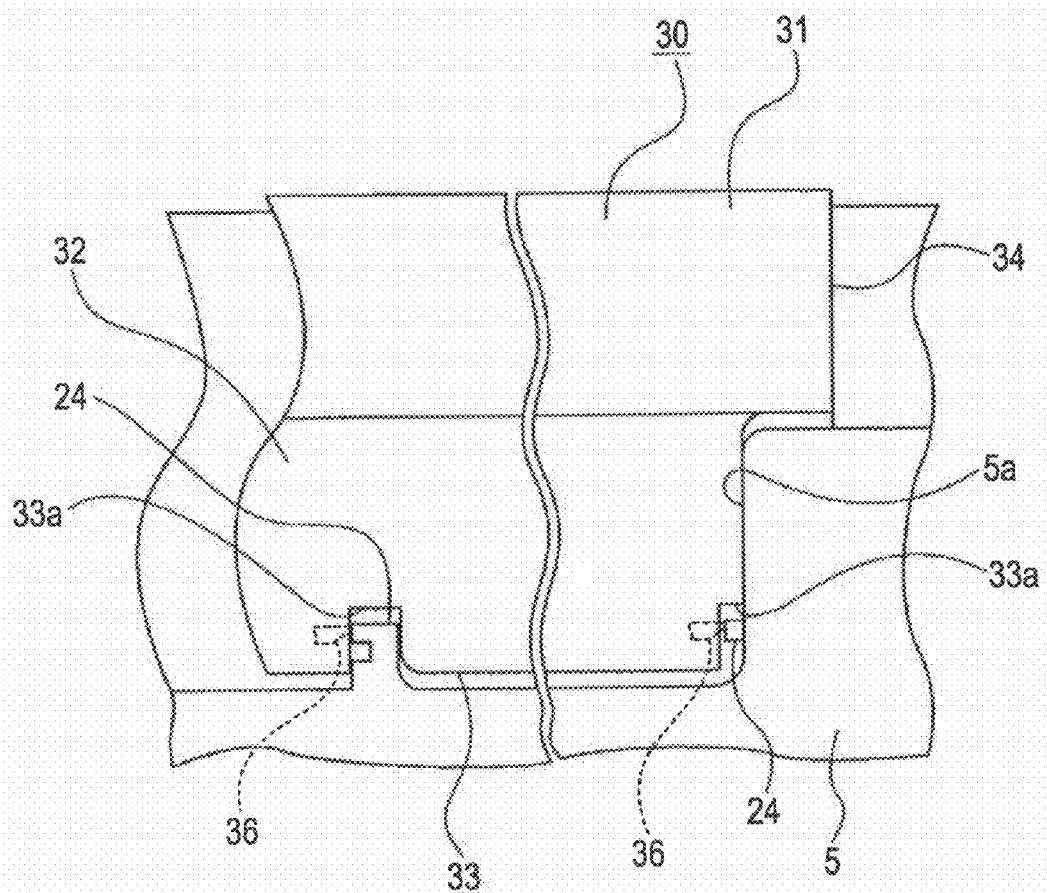
FIG. 24 is a schematic enlarged plan view illustrating a state in which the engagement pawls are moved against pressing force of spring members.
Figure 25:
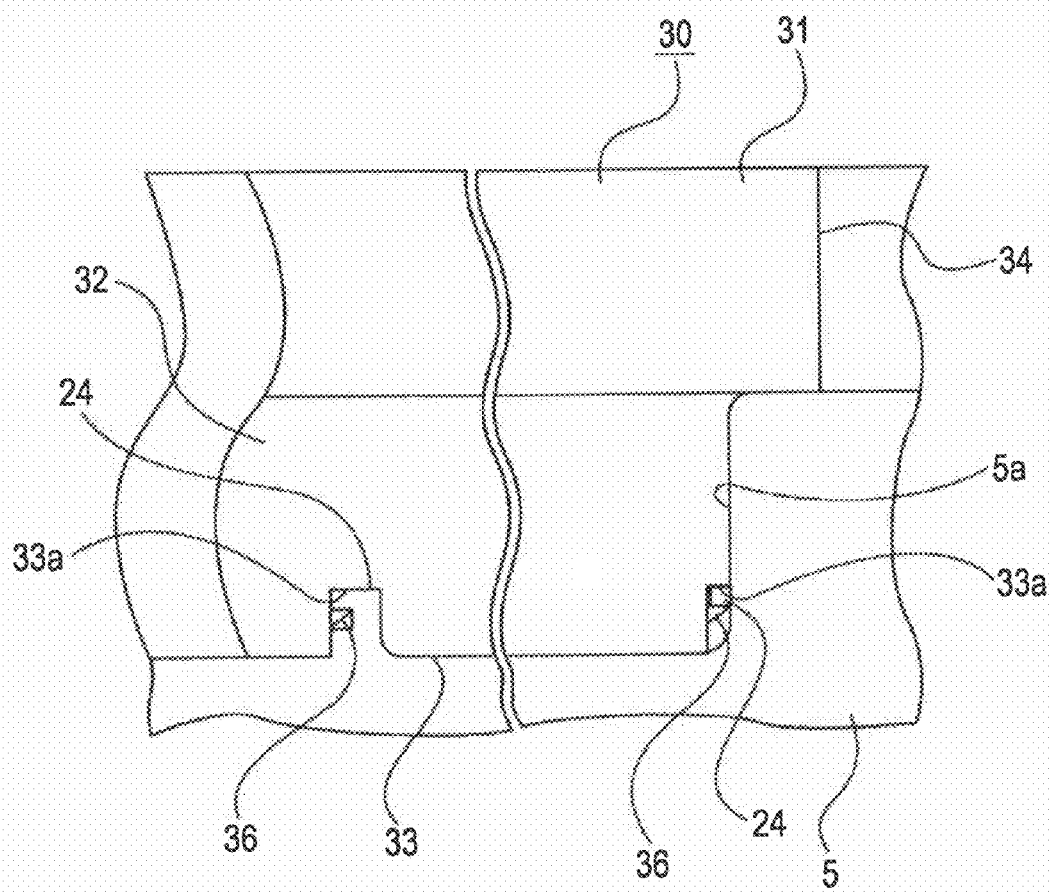
FIG. 25 is a schematic enlarged plan view illustrating a state in which the engagement pawls are engaged with the attachment pieces, and the battery is locked with the device main frame portion.

Ultimately, the battery 30 is moved forward, whereby attachment to the device main frame portion 2 is completed (see FIG. 22). When the battery 30 is attached to the device main frame portion 2, the engagement pawls 36 come into contact with the attachment pieces 24 of the casing 5 respectively (see FIG. 23). The engagement pawls 36 are moved against the pressing force of the spring members by forward movement of the battery 30 (see FIG. 24), and when the engagement pawls 36 ride up over the attachment pieces 24 by further movement of the battery 30, the engagement pawls 36 are returned to the original positions by the pressing force of the spring members and engaged with the attachment pieces 24. The battery 30 is thus locked with the device main frame portion 2 (see FIG. 25).

In a state in which the battery 30 is attached to the device main frame portion 2, the connector portion 33b is connected to the connector 23 provided in the device main frame portion 2, and the cover portions 34 are positioned adjacent to the inner side of the supported protrusions 29 protruding backward from the display portion 4. Accordingly, of the supporting protrusions 22, the portion which has not been closed by the supported protrusions 29 is closed from the outer circumferential side by the cover portions 34.

Figure 26:
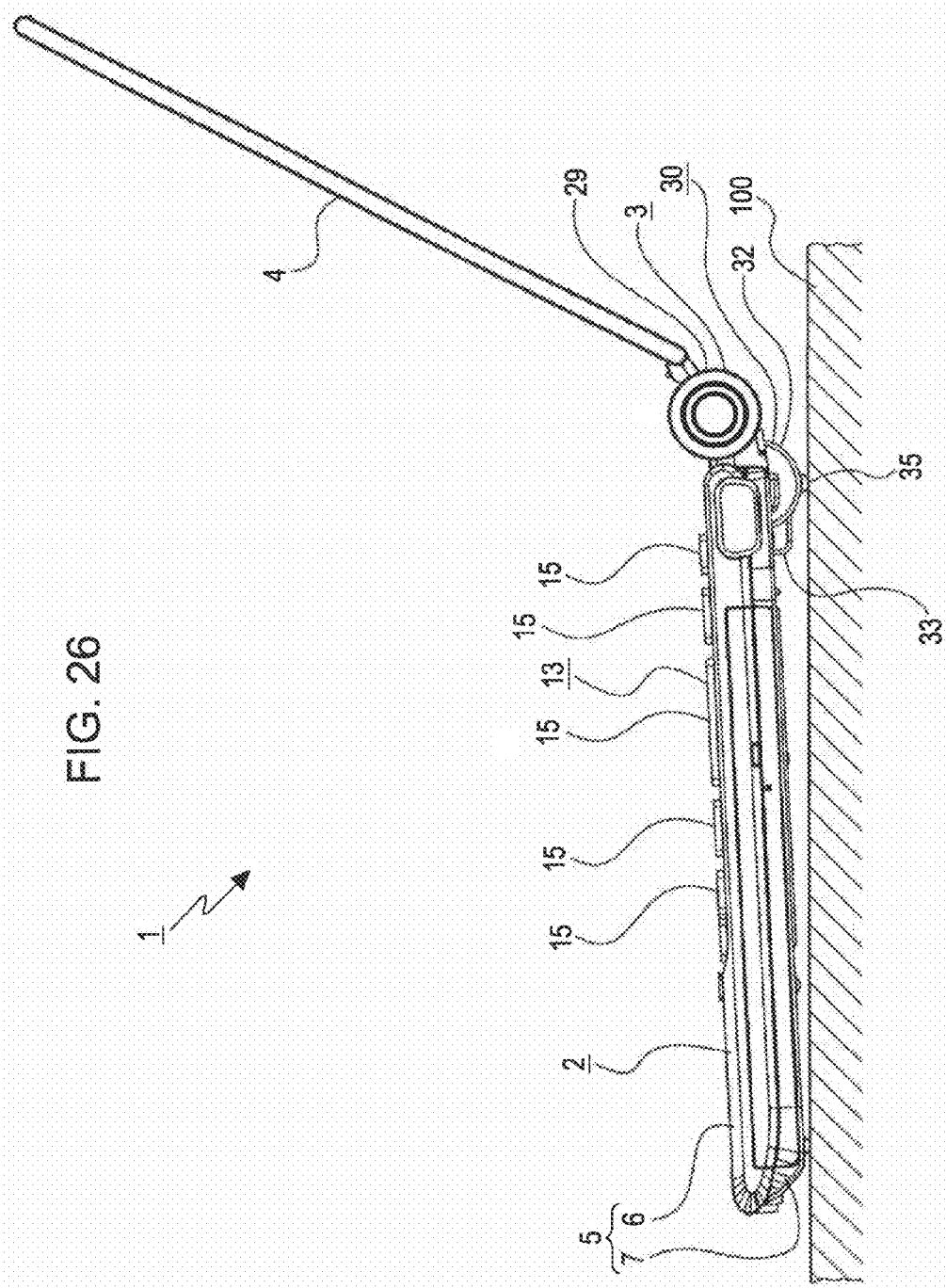
FIG. 26 is a side view of the electronic device.

In a state in which the battery 30 is attached to the device main frame portion 2, as shown in FIG. 26, upon the electronic device 1 being laid on a installation face 100 of a desk or the like, the electronic device 1 is supported on the installation face 100 by the receiving protrusions 35 provided in the second cell placement portion 32 protruding downward from the underside of the front edge portion of the device main frame portion 2 and the first cell placement portion 31, and the device main frame portion 2 is inclined in a forward-inclined state. Accordingly, the user readily operates the operating keys 15, and improvement in operability can be achieved.

Thus, with the battery 30, the electronic device 1 is supported by the second cell placement portion 32 protruding downward from the first cell placement portion 31, which eliminates necessity for providing a portion for holding the device main frame portion 2 inclined in a forward-inclined state, whereby improvement in ease of use of the electronic device 1 can be achieved even though the number of components has been reduced.

Detachment of the battery 30 from the device main frame portion 2 can be performed by making the release levers 37 slide to release the engagement between the engagement pawls 36 and attachment pieces 24, moving the battery 30 backward relative to the device main frame portion 2. The release levers 37 are provided at the underside of the battery 30, but as described above, in a state in which the electronic device 1 is laid on the installation face 100 of a desk or the like, the device main frame portion 2 is inclined in a forward-inclined state, gaps are formed between the installation face 100 and the device main frame portion 2 at the front side of the second cell placement portion 32. Accordingly, the user can make the release levers 37 slide by inserting both hands to search in the underside of the board placement portion 33 of the battery 30 from both sides of the device main frame portion 2. Thus detachment of the battery 30 from the device main frame portion 2 can be carried out while mounting the electronic device 1 on the installation face 100, and accordingly, detachment of the battery 30 from the device main frame portion 2 can be readily carried out.

As described above, with the electronic device 1, in a state in which the battery 30 is attached to the device main frame portion 2, the pair of cover portions 34 are adjacent to the pair of supported protrusions 29, and the supporting protrusions 22 are closed by the cover portions 34. This arrangement reduces the need for forming the supporting protrusions 22 in accordance with the shapes and sizes of the supported protrusions 29 and battery 30. Accordingly improvement in flexibility of designing of the electronic device 1 can be realized.

Also, gaps are typically formed only between the cover portions 34 of the battery 30, and the supported protrusions 29, so invasion of dust from the gaps is reduced, and accordingly, the excellent connection state of the battery 30 to the device main frame portion 2 can be ensured.

Figure 27:
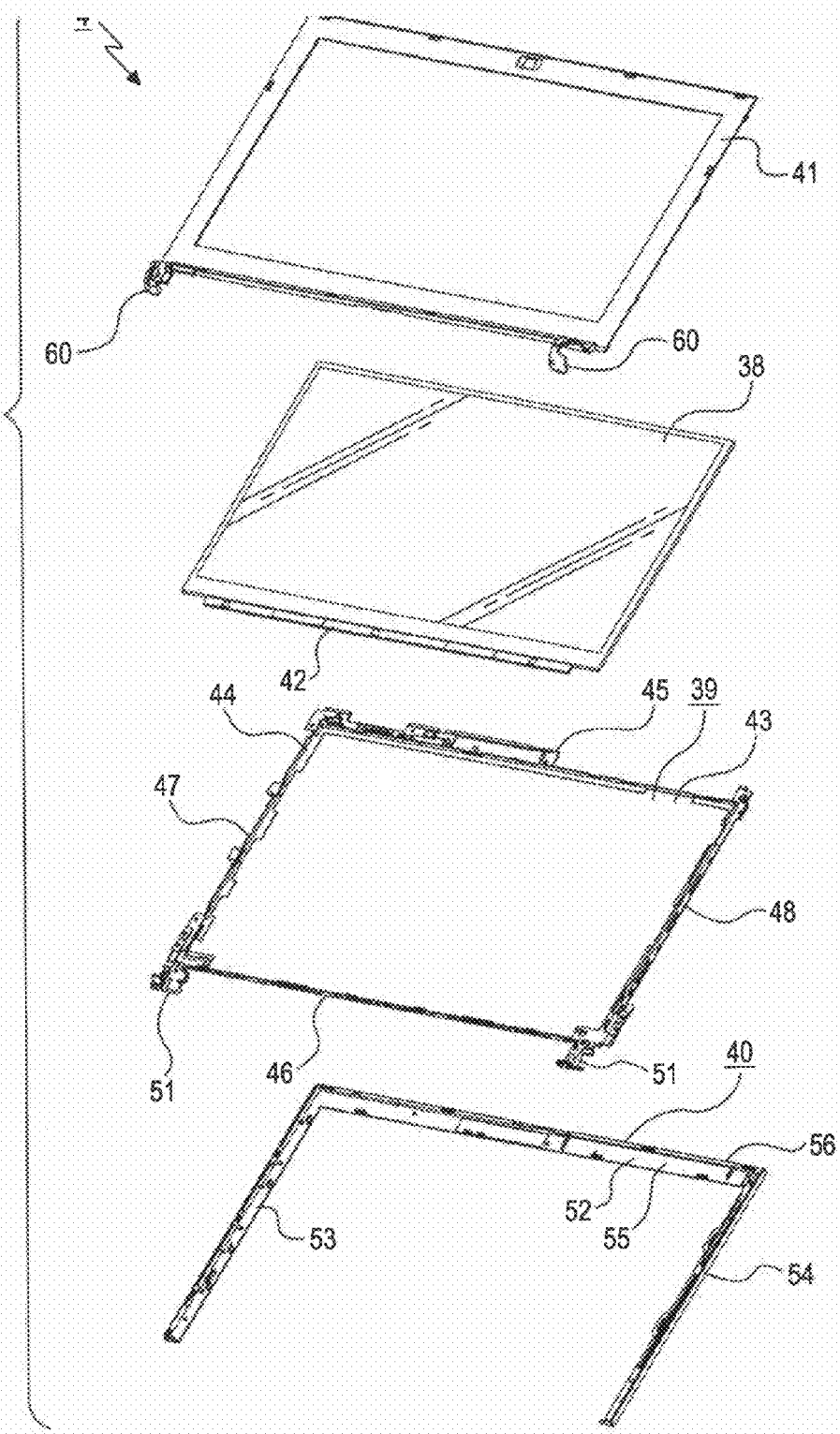
FIG. 27 is an exploded perspective view of the display portion.
Figure 28:
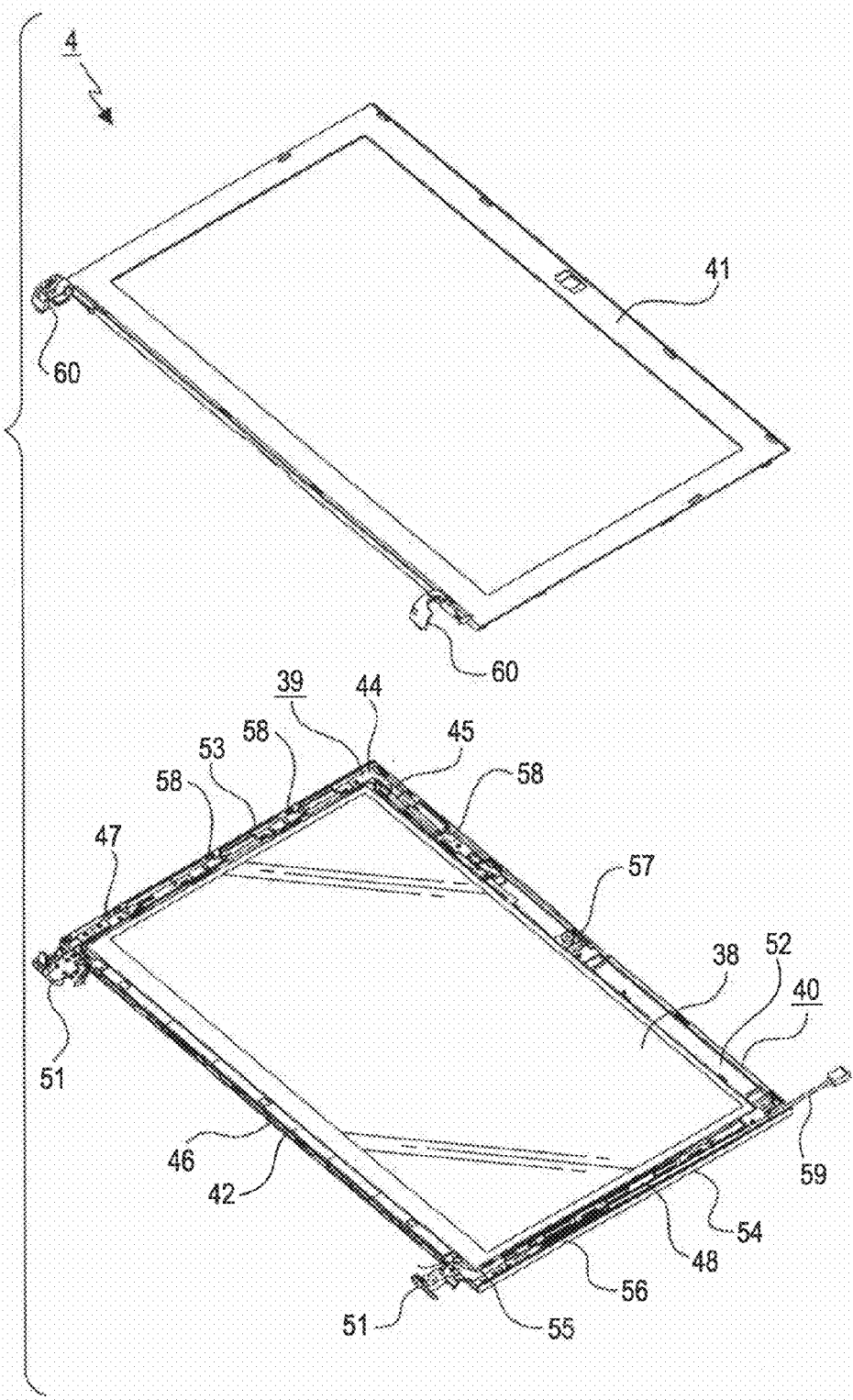
FIG. 28 is a perspective view of the display portion illustrating a state of the outer frame being separated.

The display portion 4 includes, as shown in FIGS. 27 and 28, a display panel 38, a panel casing 39 where the display panel 38 is disposed, a placement frame 40 attached to the outer perimeter of the panel casing 39, and an outer frame 41 covering the placement frame 40 from the front.

As for the display panel 38, for example, a liquid crystal display is employed, and the lower edge portion of the display panel 38 is attached with a horizontally long control board 42. The control board 42 is a board for drive-controlling the display panel 38.

Figure 29:
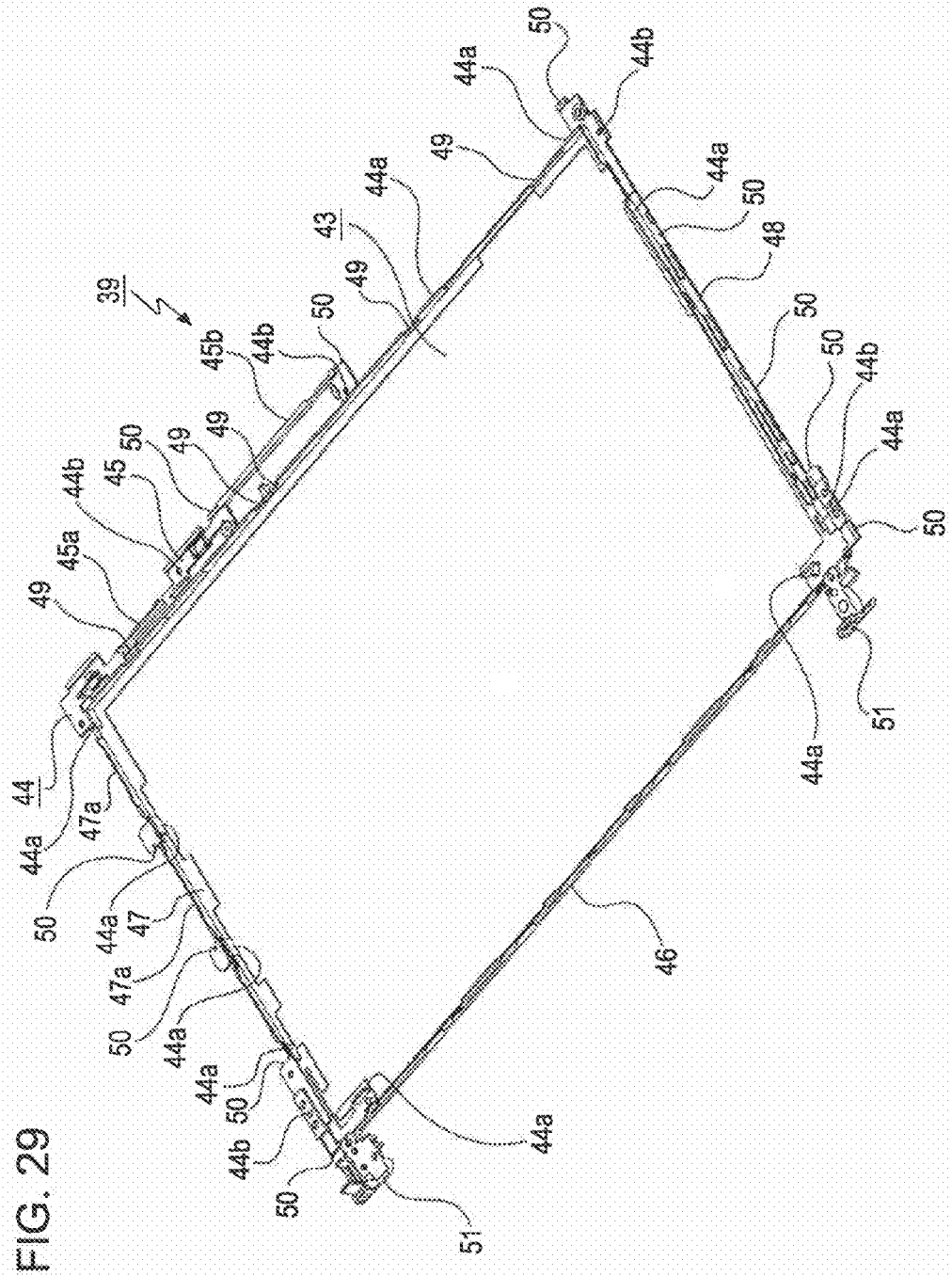
FIG. 29 is a perspective view of a panel casing.
Figure 30:
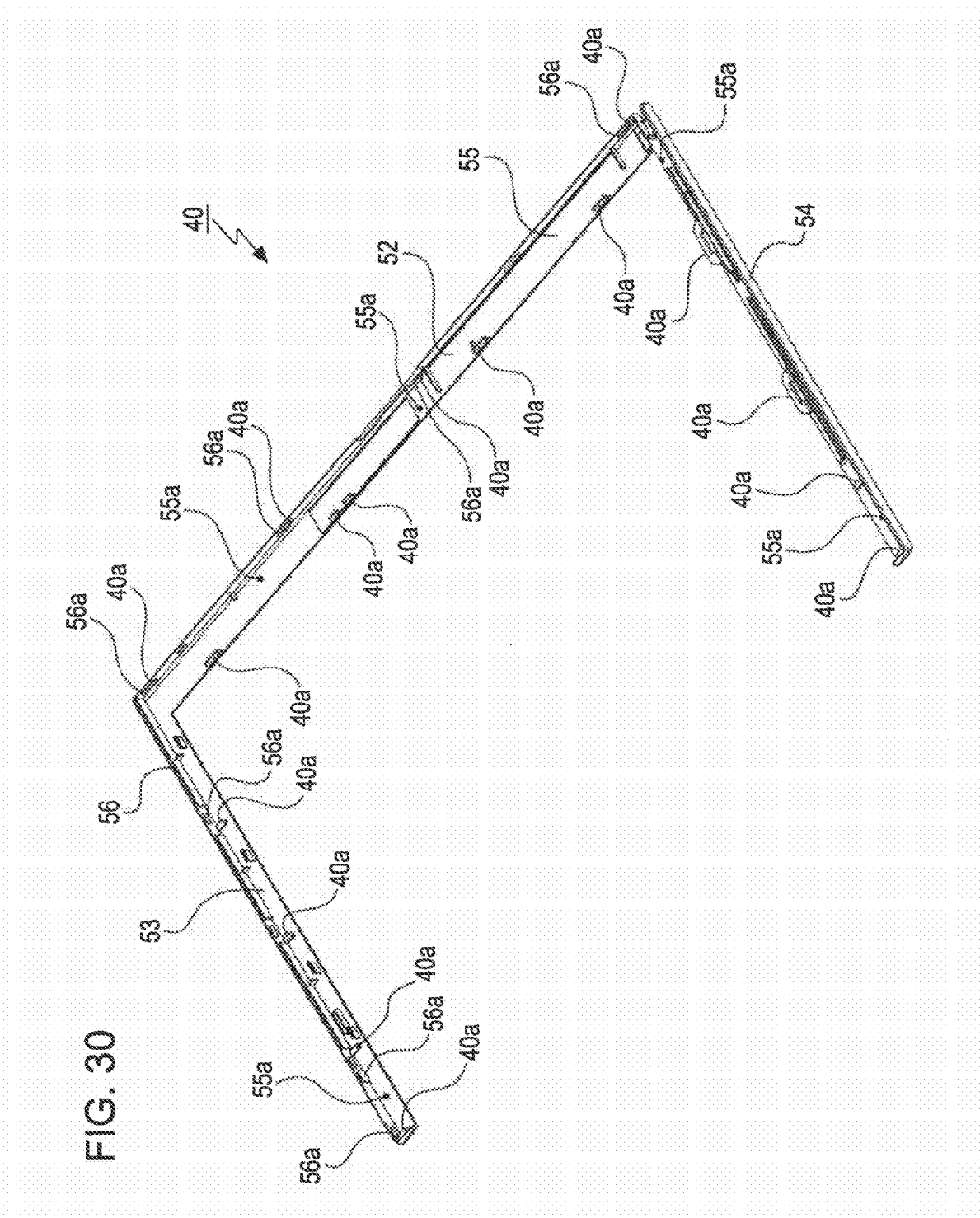
FIG. 30 is a perspective view of a placement frame.

The panel casing 39 is typically configured, for example, such that a base plate portion 43 formed of a carbon material, and a frame portion 44 provided on the outer circumferential portion of the base plate portion 43 are integrally formed by insert molding (see FIG. 29).

The base plate portion 43 is formed in a flat plate shape of a somewhat larger rectangle than the display panel 38, and the display panel 38 is disposed on the front face of the base plate portion 43. The base plate portion 43 is typically formed of a carbon material, whereby high rigidity is preferably provided.

The frame portion 44 is formed of a material including a carbon resin with a base material as a resin, and is formed in a frame shape with an upper portion 45, a lower portion 46, a left side portion 47, and right side portion 48.

The frame portion 44 is provided with walls 44a (FIG. 29) for positioning and disposing the display panel 38. A part of the wall 44a is provided as a connection engagement portion or portions 49 of which the height is lower than the other portions.

The display panel 38 is disposed on the inner side of the walls 44a and is attached to the panel casing 39.

Positioning holes 44b, which are penetrated forward and backward, are formed at predetermined positions on the frame portion 44.

Connection engagement portions 50 are provided on the outer circumferential portions of the upper portion 45, left side portion 47, and right side portion 48 of the frame portion 44, connection, respectively.

A horizontally long terminal attachment portion 45a is provided on the upper portion 45. The approximate central portion in the horizontal direction of the upper portion 45 is provided as a camera attachment portion 45b in the example depicted in FIG. 29.

Vertically long terminal attachment portions 47a are isolated and provided upward and downward on the left side portion 47.

Protrusions for hinges 51 protrude downward from both side edge portions of the lower portion 46. The protrusions for hinges 51 are disposed within the supported protrusions 29, and are connected to the supporting protrusions 22 through an unshown rotational movement mechanism, respectively.

In the placement frame 40, a horizontally long upper face portion 52, a left side face portion 53, and a right side face portion 54 each protrude downward from both side edge portions of the upper face portion 52 and are formed integral with a resin material.

The placement frame 40 includes a flat plate portion 55 formed in a plate shape which is directed forward and backward, a wall 56 protruding forward from the outer circumferential portion of the flat plate portion 55. Connection engagement portions 40a are provided at predetermined positions of the placement frame 40.

Multiple positioning pins 55a protrude forward on the flat plate portion 55.

Engagement portions 56a are provided on the inner face of the wall portion 56. A part of the engagement portions 56a also serve as connection engagement portions 40a. Accordingly, simplification of the configuration can be achieved.

In the placement frame 40, the positioning pins 55a are inserted in the positioning holes 44b of the panel casing 39 from the back to perform positioning respectively, and the connection engagement portions 40a are engaged with the connection engagement portions 49 of the panel casing 39 to connect to the panel casing 39 respectively. Accordingly, connection between the placement frame 40 and panel casing 39 is performed only by engagement between the connection engagement portions 40a, and the connection engagement portions 49 and 50.

Figure 31:
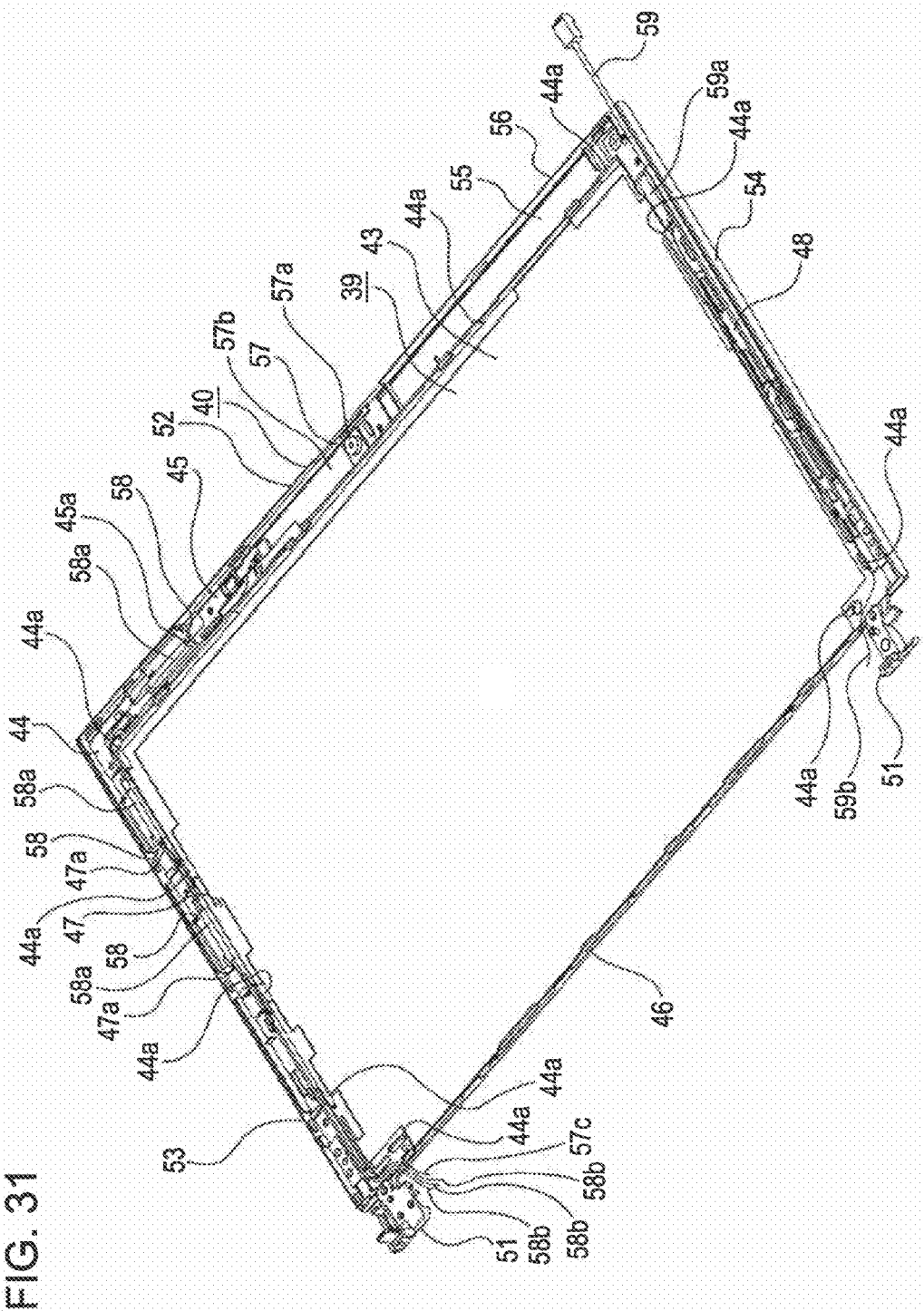
FIG. 31 is a perspective view illustrating a state in which the respective portions are attached to the panel casing and placement frame.

A camera unit 57 is attached to the camera unit attachment portion 45b of the upper portion 45 of the panel casing 39 (see FIGS. 28 and 31). The camera unit 57 includes a camera main unit 57a and a control board 57b. A connection line 57c is extended from the camera unit 57, and the connection line 57c is passed through from the upper portion 45 of the panel casing 39, the left side portion 47, the inside of the supported protrusion 29, to the inside of the supporting portion 22, and is connected to the control circuit board (mother board) disposed in the inside of the device main frame portion 2.

Figure 32:
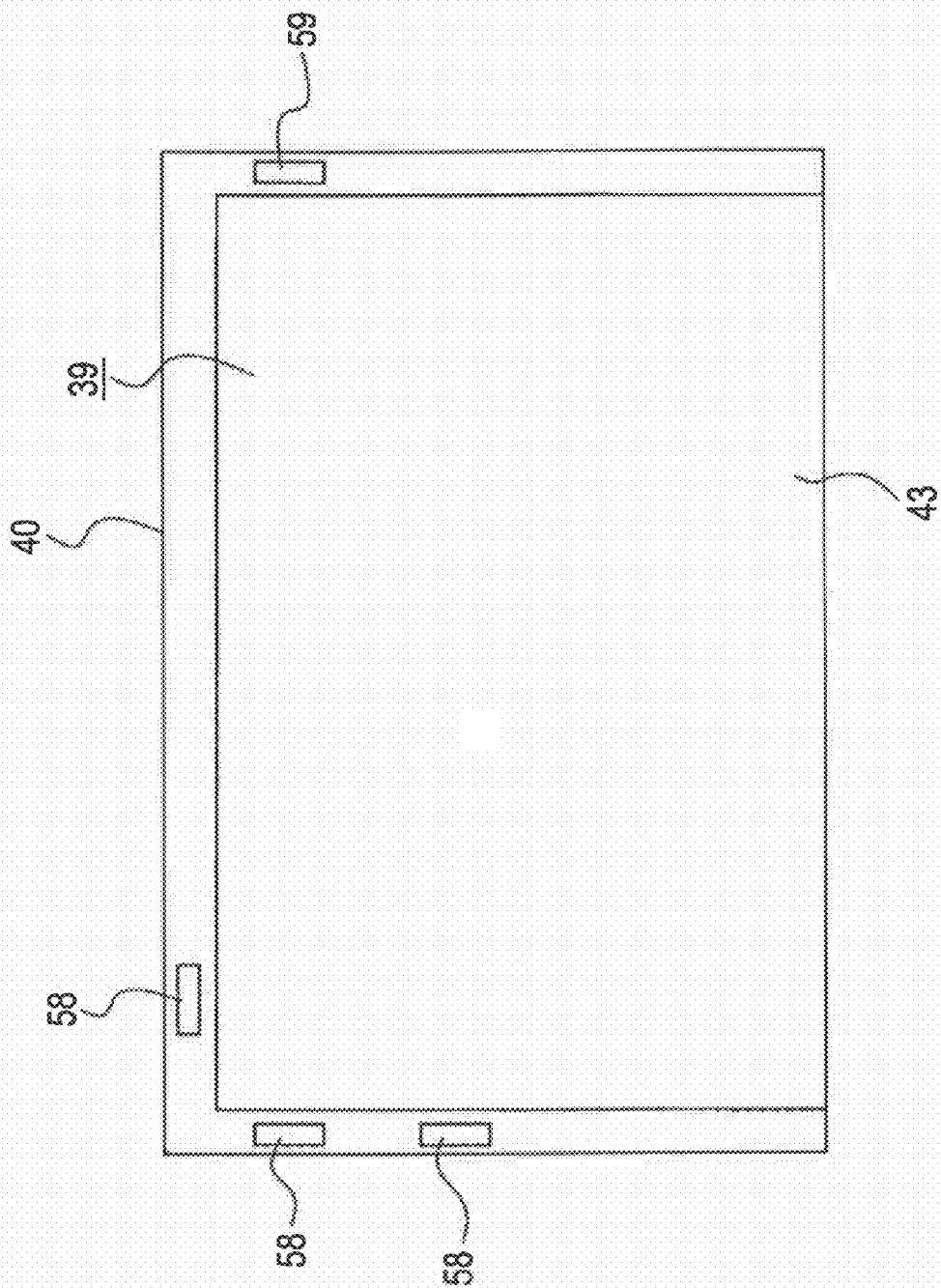
FIG. 32 is a conceptual view illustrating a state in which a first antenna and a second antenna are disposed on the placement frame.

First antenna 58 and a second antenna 59 are disposed in a state in which the panel casing 39 and placement frame 40 are connected (see FIGS. 31 and 32). Each of the first antennas 58 is configured for use in, for example, a wireless LAN (WLAN) system, and the second antenna 59 is configured for use in, for example, a one-segment broadcasting system, a digital TV system in Japan, or, for example, in Bluetooth, WiMax, or GPS systems.

The first antennas 58 are disposed at a position close to the left edge of the upper face portion 52, and positions isolated upward and downward at the upper side of the left side face portion 53, of the placement frame 40, respectively. Metal grounding terminals 58a are provided at the first antennas 58 respectively, being attached to the terminal attachment portions 45a, 47a, and 47a of the panel casing 39, and grounded, respectively.

Connection cables 58b are extended from the first antennas 58 respectively, and the connection cables 58b are passed through from the upper portion 45 or left side portion 47 of the panel casing 39, the inside of the supported protrusion 29, to the inside of the supporting protrusion 22, and are connected to the control circuit board (mother board) disposed in the inside of the device main frame portion 2.

In the example depicted in FIG. 31, the second antenna 59 is disposed on the upper side of the right side face portion 54 of the placement frame 40. A metal terminal for grounding 59a is provided at the second antenna 59, and the metal terminal 59a is connected to the panel casing 39, and grounded.

A connection cable 59b extends from the second antenna 59 and passes through from the right side portion 48 of the panel casing 39, the inside of the supported protrusion 29, to the inside of the supporting protrusion 22. The connection cable 59b is thus connected to the control circuit board (mother board) disposed in the inside of the device main frame portion 2.

The second antenna 59 includes an antenna shaft 59c, which is configured to be drawn out from and be stored in the display portion 4.

An outer frame 41 is attached to the placement frame 40 from the front. The outer frame 41 is formed in a rectangular frame shape, and protrusions for hinges 60 each protruding downward are disposed at both side edge portions of the lower edge portion of the outer frame 41. The protrusions for hinges 60 and 60 are connected to protrusions for hinges 51 provided in the panel casing 39 respectively, and are disposed in the inside of the supported protrusions 29 along with the protrusions for hinges 51, and are linked to the supporting protrusions 22 via an unshown rotational movement mechanism so as to be rotatable.

Figure 33:
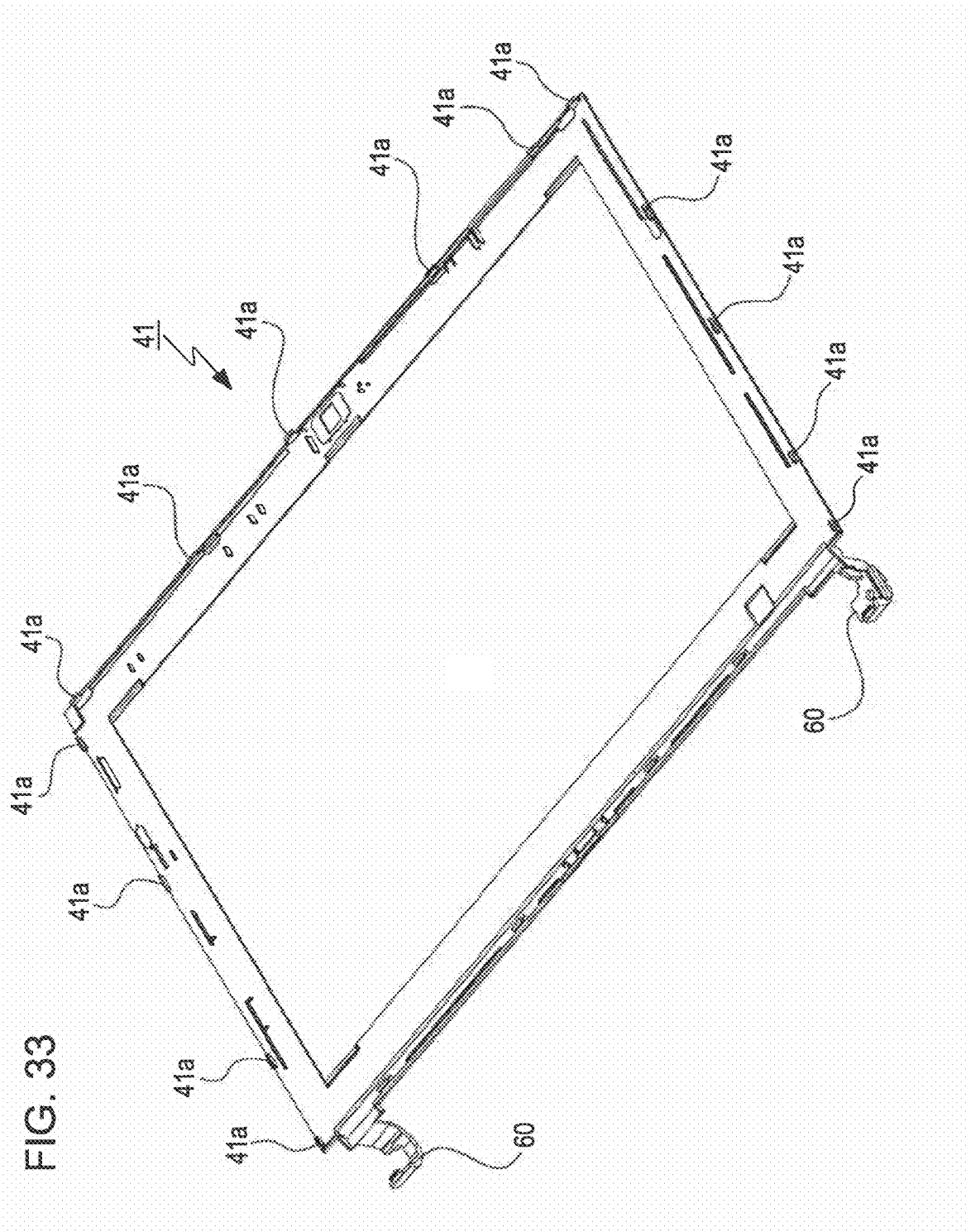
FIG. 33 is a perspective view of the outer frame.

As shown in FIG. 33, multiple engagement portions 41a are isolated around the perimeter and provided on the rear face of the outer frame 41, and the engagement portions 41a protrude downward.

The outer frame 41 is connected to the placement frame 40 by the engagement portions 41a being engaged with the engagement portions 56a respectively. Accordingly, connection between the placement frame 40 and outer frame 41 is preferably performed only by engagement between the engagement portions 41a, and the engagement portions 56a.

In a state in which the outer frame 41 is connected to the placement frame 40, the entirety of the placement frame 40 and the outer perimeter portion of the display panel 38 are covered from the front.

As described above, with the electronic device 1, the first antennas 58 are disposed on the upper face portion 52 and left side face portion 53 of the placement frame 40 formed of a nonmetallic material, and the second antenna 59 is disposed on the right side face portion 54.

Accordingly, improvement in communication performance can be achieved following sufficient space for disposing the first antennas 58, and the second antenna 59, the first antennas configured for use in a different communication system than the second antenna. In particular, the first antennas 58 are disposed on the upper face portion 52 and left side face portion 53, whereby improvement in sensitivity is realized by a signal having intensity necessary for each of the first antennas 58 being received, and accordingly, communication performance can be enhanced.

Also, the first antennas 58 and the second antenna 59 are disposed at the upward side, and accordingly the first antennas 58 and the second antenna 59 are isolated from a desk (installation face 100) and the device main frame portion 2, which may shield incoming radio waves to be received, thereby improving reception sensitivity. Additionally, the possibility of receiving unnecessary noise which may be caused from the device main frame portion 2 decreases, and an excellent communication state can be ensured.

Further, connection between the placement frame 40 and outer frame 41 is performed only by engagement between the engagement portions 41a, and the engagement portions 56a, whereby improvement in the reception sensitivity of the first antennas 58, and the second antenna 59 can be achieved without employing metal fixing screws which may deteriorate reception sensitivity at the time of connection between the placement frame 40 and outer frame 41.

Further, connection between the placement frame 40 and panel casing 39 is also performed only by engagement between the connection engagement portions 40a, and the connection engagement portions 49 and 50, whereby improvement in the reception sensitivity of the first antennas 58, and the second antenna 59 can be achieved without employing metal fixing screws, which may deteriorate reception sensitivity at the time of connection between the placement frame 40 and panel casing 39.

Additionally, the second antenna 59 is configured to be drawn out and stored, and can be moved in and out within the display portion 4 and outside, whereby the second antenna 59 can be elevated by drawing out the second antenna 59, and accordingly, improvement in reception sensitivity can be achieved.

Note that the example has been shown above wherein the second antenna 59 is disposed on the right side face portion 54 of the placement frame 40, but the second antenna 59 may be disposed on the upper face portion 52 of the placement frame 40.

Also, the example has been shown above wherein the antenna for use in a one-segment broadcasting system is disposed as the second antenna 59, but for example, as shown in FIGS. 34 and 35, an antenna for use in a WAN (Wide Area Network) system may be disposed as a second antenna 59A. In this case, there is a possibility that there is a need to dispose two second antennas 59A, but in a case wherein there is a need to dispose the two second antennas 59A, the second antennas 59A may be disposed on the upper face portion 52 and right side face portion 54, respectively.

The second antennas 59A are disposed on the upper face portion 52 and right side face portion 54 respectively, whereby improvement in sensitivity is realized by a signal having intensity necessary for each of the second antennas 59A being received, and accordingly, communication performance can be enhanced.

An example has been described above wherein an antenna for use in a wireless LAN system is employed as the first antenna 58, and an antenna for use in a one-segment or WAN system is employed as the second antennas 59 and 59A, but the first antenna and second antenna are not restricted to the antennas for use in those communication systems, and antennas for use in optical or other communication systems can be employed.

Also, an example has been shown above wherein the two types of antennas for use in different communication systems are disposed, but the types of antennas are not restricted to two types, and antennas for use in three types or more of communication systems may be disposed.

The specific shapes and configurations of the components shown in the embodiments are only examples for implementing the present invention, and should not be interpreted restrictively. It should be understood by those skilled in the art that various modifications, combinations, sub-combinations and alterations may occur depending on design requirements and other factors insofar as they are within the scope of the appended claims or the equivalents thereof.

What is claimed is:

1. An electronic device comprising:
    a plurality of first antennas;
    at least one second antenna configured to be used in a different communication system than the plurality of first antennas;
    a display panel configured to display an image;
    a panel casing configured to cover said display panel on a side opposite to a display surface;
    a placement frame formed of a nonmetallic material having an upper face portion disposed on an outer perimeter of said panel casing and extending in the horizontal direction, and
    a pair of side face portions, each protruding from a different side edge portion of said upper face portion in a direction orthogonal thereto; and
    an outer frame formed of a nonmetallic material configured to cover the outer perimeter and said placement frame of said display panel from the display surface side of said display panel, wherein
    at least one first antenna is disposed on each of the upper face portion and one of the pair of side face portions of said placement frame, and
    the at least one second antenna is disposed on the upper face portion or the other side face portion of said placement frame.

2. The electronic device according to claim 1, further comprising:
    a plurality of engagement portions disposed on said placement frame; and
    a different plurality of engagement portions disposed on said outer frame with which said plurality of engagement portions of said placement frame are engaged respectively, wherein
    said placement frame and said outer frame are configured to be connected only by engagement between said engagement portions of said placement frame and said different plurality of engagement portions of said outer frame.

3. The electronic device according to claim 1, further comprising:
    a plurality of connection engagement portions disposed on said placement frame; and
    a different plurality of connection engagement portions disposed on said panel casing with which said plurality of connection engagement portions of said placement frame are engaged respectively, wherein
    said placement frame and said panel casing are configured to be connected only by engagement between said connection engagement portions of said placement frame and said different plurality of connection engagement portions of said panel casing.

4. The electronic device according to claim 1, wherein said second antenna is configured to be drawn out or stored in a space formed between said placement frame and said outer frame.

5. The electronic device according to claim 1, wherein said first antennas are wireless local area network (WLAN) antennas and the at least one second antenna is for one-segment broadcasting.

6. The electronic device according to claim 1, wherein the at least one second antenna is a WLAN antenna.

7. The electronic device according to claim 1, wherein the at least one second antenna is a cellular antenna.

8. The electronic device according to claim 1, further comprising at least one third antenna configured to be used in a different communication system than the plurality of first antennas and the at least one second antenna.

* * * * *